United States Patent
Kadous et al.

(10) Patent No.: US 9,860,033 B2
(45) Date of Patent: *Jan. 2, 2018

(54) METHOD AND APPARATUS FOR ANTENNA DIVERSITY IN MULTI-INPUT MULTI-OUTPUT COMMUNICATION SYSTEMS

(75) Inventors: Tamer Kadous, San Diego, CA (US); Aamod Khandekar, San Diego, CA (US); Dhananjay Ashok Gore, San Diego, CA (US); Alexei Gorokhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,113

(22) Filed: Oct. 11, 2011

(65) Prior Publication Data

US 2012/0140838 A1 Jun. 7, 2012

Related U.S. Application Data

(63) Continuation of application No. 11/261,823, filed on Oct. 27, 2005, now abandoned.

(Continued)

(51) Int. Cl.
*H04L 5/00* (2006.01)
*H04L 27/26* (2006.01)
(Continued)

(52) U.S. Cl.
CPC ......... *H04L 5/0023* (2013.01); *H04B 7/0456* (2013.01); *H04B 7/061* (2013.01);
(Continued)

(58) Field of Classification Search
CPC ...... H04B 7/04; H04B 7/0404; H04B 7/0408; H04B 7/0413; H04B 7/0417;
(Continued)

(56) References Cited

U.S. PATENT DOCUMENTS

| 4,393,276 A | 7/1983 | Steele |
| 4,554,668 A | 11/1985 | Deman et al. |

(Continued)

FOREIGN PATENT DOCUMENTS

| AR | 050795 A1 | 11/2006 |
| AU | 2005319084 | 4/2010 |

(Continued)

OTHER PUBLICATIONS

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.

(Continued)

*Primary Examiner* — Young T Tse

(57) ABSTRACT

Transmission schemes that can flexibly achieve the desired spatial multiplexing order, spatial diversity order, and channel estimation overhead order are described. For data transmission, the assigned subcarriers and spatial multiplexing order (M) for a receiver are determined, where M≥1. For each assigned subcarrier, M virtual antennas are selected from among V virtual antennas formed with V columns of an orthonormal matrix, where V≥M. V may be selected to achieve the desired spatial diversity order and channel estimation overhead order. Output symbols are mapped to the M virtual antennas selected for each assigned subcarrier by applying the orthonormal matrix. Pilot symbols are also mapped to the V virtual antennas. The mapped symbols are (Continued)

provided for transmission from T transmit antennas, where T≥V. Transmission symbols are generated for the mapped symbols, e.g., based on OFDM or SC-FDMA. Different cyclic delays may be applied for the T transmit antennas to improve diversity.

23 Claims, 14 Drawing Sheets

Related U.S. Application Data

(60) Provisional application No. 60/710,408, filed on Aug. 22, 2005, provisional application No. 60/711,144, filed on Aug. 24, 2005.

(51) Int. Cl.
  *H04B 7/04* (2017.01)
  *H04B 7/06* (2006.01)
  *H04B 7/0456* (2017.01)

(52) U.S. Cl.
  CPC ......... *H04B 7/0671* (2013.01); *H04B 7/0691* (2013.01); *H04B 7/0697* (2013.01); *H04L 27/2602* (2013.01)

(58) Field of Classification Search
  CPC ...... H04B 7/0452; H04B 7/0456; H04B 7/06; H04B 7/0608; H04B 7/061; H04B 7/0619; H04B 7/0626; H04B 7/0632; H04B 7/0634
  USPC ....... 375/135, 146, 260, 262, 265, 267, 299; 370/208; 455/500, 69, 101
  See application file for complete search history.

(56) References Cited

U.S. PATENT DOCUMENTS

| | | |
|---|---|---|
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |
| 5,115,248 A | 5/1992 | Roederer |
| 5,268,694 A | 12/1993 | Jan et al. |
| 5,282,222 A | 1/1994 | Fattouche et al. |
| 5,363,408 A | 11/1994 | Paik et al. |
| 5,371,761 A | 12/1994 | Daffara et al. |
| 5,384,810 A | 1/1995 | Amrany |
| 5,406,551 A | 4/1995 | Saito et al. |
| 5,410,538 A | 4/1995 | Roche et al. |
| 5,455,839 A | 10/1995 | Eyuboglu |
| 5,465,253 A | 11/1995 | Rahnema |
| 5,491,727 A | 2/1996 | Petit |
| 5,513,379 A | 4/1996 | Benveniste et al. |
| 5,539,748 A | 7/1996 | Raith |
| 5,548,582 A | 8/1996 | Brajal et al. |
| 5,553,069 A | 9/1996 | Ueno et al. |
| 5,583,869 A | 12/1996 | Grube et al. |
| 5,594,738 A | 1/1997 | Crisler et al. |
| 5,604,744 A | 2/1997 | Andersson et al. |
| 5,612,978 A | 3/1997 | Blanchard et al. |
| 5,625,876 A | 4/1997 | Gilhousen et al. |
| 5,684,491 A | 11/1997 | Newman et al. |
| 5,726,978 A | 3/1998 | Frodigh et al. |
| 5,732,113 A | 3/1998 | Schmidl et al. |
| 5,745,487 A | 4/1998 | Hamaki |
| 5,768,276 A | 6/1998 | Diachina et al. |
| 5,790,537 A | 8/1998 | Yoon et al. |
| 5,812,938 A | 9/1998 | Gilhousen et al. |
| 5,815,488 A | 9/1998 | Williams et al. |
| 5,822,368 A | 10/1998 | Wang |
| 5,828,650 A | 10/1998 | Malkamaki et al. |
| 5,838,268 A | 11/1998 | Frenkel |
| 5,852,630 A | 12/1998 | Langberg et al. |
| 5,867,478 A | 2/1999 | Baum et al. |
| 5,870,393 A | 2/1999 | Yano et al. |
| 5,887,023 A | 3/1999 | Mabuchi |
| 5,907,585 A | 5/1999 | Suzuki et al. |
| 5,920,571 A | 7/1999 | Houck et al. |
| 5,926,470 A | 7/1999 | Tiedemann, Jr. |
| 5,933,421 A | 8/1999 | Alamouti et al. |
| 5,949,814 A | 9/1999 | Odenwalder et al. |
| 5,953,325 A | 9/1999 | Willars |
| 5,955,992 A | 9/1999 | Shattil |
| 5,956,642 A | 9/1999 | Larsson et al. |
| 5,995,992 A | 11/1999 | Eckard |
| 5,999,826 A | 12/1999 | Whinnett |
| 6,000,054 A | 12/1999 | Bahr et al. |
| 6,002,942 A | 12/1999 | Park |
| 6,016,123 A | 1/2000 | Barton et al. |
| 6,038,263 A | 3/2000 | Kotzin et al. |
| 6,038,450 A | 3/2000 | Brink et al. |
| 6,052,364 A | 4/2000 | Chalmers et al. |
| 6,061,337 A | 5/2000 | Light et al. |
| 6,067,315 A | 5/2000 | Sandin |
| 6,075,350 A | 6/2000 | Peng |
| 6,075,797 A | 6/2000 | Thomas |
| 6,076,114 A | 6/2000 | Wesley |
| 6,084,919 A | 7/2000 | Kleider et al. |
| 6,088,345 A | 7/2000 | Sakoda et al. |
| 6,088,592 A | 7/2000 | Doner et al. |
| 6,108,323 A | 8/2000 | Gray |
| 6,108,550 A | 8/2000 | Wiorek et al. |
| 6,112,094 A | 8/2000 | Dent |
| 6,128,776 A | 10/2000 | Kang |
| 6,138,037 A | 10/2000 | Jaamies |
| 6,141,317 A | 10/2000 | Marchok et al. |
| 6,154,484 A | 11/2000 | Lee et al. |
| 6,169,910 B1 | 1/2001 | Tamil et al. |
| 6,172,993 B1 | 1/2001 | Kim et al. |
| 6,175,550 B1 | 1/2001 | Van Nee |
| 6,175,650 B1 | 1/2001 | Sindhu et al. |
| 6,176,550 B1 | 1/2001 | Lamart et al. |
| 6,198,775 B1 | 3/2001 | Khayrallah et al. |
| 6,215,983 B1 | 4/2001 | Dogan et al. |
| 6,226,280 B1 | 5/2001 | Roark et al. |
| 6,232,918 B1 | 5/2001 | Wax et al. |
| 6,240,129 B1 | 5/2001 | Reusens et al. |
| 6,249,683 B1 | 6/2001 | Lundby et al. |
| 6,256,478 B1 | 7/2001 | Allen et al. |
| 6,271,946 B1 | 8/2001 | Chang et al. |
| 6,272,122 B1 | 8/2001 | Wee |
| 6,310,704 B1 | 10/2001 | Dogan et al. |
| 6,317,435 B1 | 11/2001 | Tiedemann, Jr. et al. |
| 6,335,922 B1 | 1/2002 | Tiedemann, Jr. et al. |
| 6,337,659 B1 | 1/2002 | Kim |
| 6,337,983 B1 | 1/2002 | Bonta et al. |
| 6,353,637 B1 | 3/2002 | Mansour et al. |
| 6,363,060 B1 | 3/2002 | Sarkar |
| 6,374,115 B1 | 4/2002 | Barnes et al. |
| 6,377,539 B1 | 4/2002 | Kang et al. |
| 6,377,809 B1 | 4/2002 | Rezaiifar et al. |
| 6,388,998 B1 | 5/2002 | Kasturia |
| 6,393,008 B1 | 5/2002 | Cheng et al. |
| 6,393,012 B1 | 5/2002 | Pankaj |
| 6,401,062 B1 | 6/2002 | Murashima |
| 6,438,369 B1 | 8/2002 | Huang et al. |
| 6,449,246 B1 | 9/2002 | Barton et al. |
| 6,466,800 B1 | 10/2002 | Sydon et al. |
| 6,473,467 B1 | 10/2002 | Wallace et al. |
| 6,477,317 B1 | 11/2002 | Itokawa |
| 6,478,422 B1 | 11/2002 | Hansen |
| 6,483,820 B1 | 11/2002 | Davidson et al. |
| 6,487,243 B1 | 11/2002 | Hwang et al. |
| 6,496,790 B1 | 12/2002 | Kathavate et al. |
| 6,501,810 B1 | 12/2002 | Karim et al. |
| 6,507,601 B2 | 1/2003 | Parsa et al. |
| 6,519,462 B1 | 2/2003 | Lu et al. |
| 6,529,525 B1 | 3/2003 | Pecen et al. |
| 6,535,666 B1 | 3/2003 | Dogan et al. |
| 6,539,008 B1 | 3/2003 | Ahn et al. |

(56) References Cited

U.S. PATENT DOCUMENTS

| | | |
|---|---|---|
| 6,539,213 B1 | 3/2003 | Richards et al. |
| 6,542,485 B1 | 4/2003 | Mujtaba |
| 6,542,743 B1 | 4/2003 | Soliman |
| 6,563,806 B1 | 5/2003 | Yano et al. |
| 6,563,881 B1 | 5/2003 | Sakoda et al. |
| 6,577,739 B1 | 6/2003 | Hurtig et al. |
| 6,584,140 B1 | 6/2003 | Lee |
| 6,590,881 B1 | 7/2003 | Wallace et al. |
| 6,597,746 B1 | 7/2003 | Amrany et al. |
| 6,601,206 B1 | 7/2003 | Marvasti |
| 6,614,857 B1 | 9/2003 | Buehrer et al. |
| 6,625,172 B2 | 9/2003 | Odenwalder et al. |
| 6,636,568 B2 | 10/2003 | Kadous |
| 6,654,339 B1 | 11/2003 | Bohnke et al. |
| 6,654,431 B1 | 11/2003 | Barton et al. |
| 6,657,949 B1 | 12/2003 | Jones, IV et al. |
| 6,658,258 B1 | 12/2003 | Chen et al. |
| 6,674,787 B1 | 1/2004 | Dick et al. |
| 6,674,810 B1 | 1/2004 | Cheng |
| 6,675,012 B2 | 1/2004 | Gray |
| 6,678,318 B1 | 1/2004 | Lai |
| 6,690,951 B1 | 2/2004 | Cuffaro et al. |
| 6,693,952 B1 | 2/2004 | Chuah et al. |
| 6,701,165 B1 | 3/2004 | Ho et al. |
| 6,704,571 B1 | 3/2004 | Moon |
| 6,711,400 B1 | 3/2004 | Aura |
| 6,717,908 B2 | 4/2004 | Vijayan et al. |
| 6,721,568 B1 | 4/2004 | Gustavsson et al. |
| 6,724,719 B1 | 4/2004 | Tong et al. |
| 6,731,602 B1 | 5/2004 | Watanabe et al. |
| 6,735,244 B1 | 5/2004 | Hasegawa et al. |
| 6,744,743 B2 | 6/2004 | Walton et al. |
| 6,748,220 B1 | 6/2004 | Chow et al. |
| 6,751,444 B1 | 6/2004 | Meiyappan |
| 6,751,456 B2 | 6/2004 | Bilgic |
| 6,754,511 B1 | 6/2004 | Halford et al. |
| 6,763,009 B1 | 7/2004 | Bedekar et al. |
| 6,765,969 B1 | 7/2004 | Vook et al. |
| 6,771,706 B2 | 8/2004 | Ling et al. |
| 6,776,165 B2 | 8/2004 | Jin |
| 6,776,765 B2 | 8/2004 | Soukup et al. |
| 6,778,513 B2 | 8/2004 | Kasapi et al. |
| 6,785,341 B2 | 8/2004 | Walton et al. |
| 6,798,736 B1 | 9/2004 | Black et al. |
| 6,799,043 B2 | 9/2004 | Tiedemann, Jr. et al. |
| 6,802,035 B2 | 10/2004 | Catreux et al. |
| 6,804,307 B1 | 10/2004 | Popovic |
| 6,813,284 B2 | 11/2004 | Vayanos et al. |
| 6,821,535 B2 | 11/2004 | Nurmi et al. |
| 6,828,293 B1 | 12/2004 | Hazenkamp et al. |
| 6,829,293 B2 | 12/2004 | Jones et al. |
| 6,831,943 B1 | 12/2004 | Dabak et al. |
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,888,809 B1 | 5/2005 | Foschini et al. |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,827 B2 | 9/2005 | Li et al. |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B2 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling et al. |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,405 B2 | 5/2006 | Attar et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore et al. |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,157,351 B2 | 1/2007 | Cheng et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,942 B2 | 6/2007 | Laroia et al. |

(56) References Cited

U.S. PATENT DOCUMENTS

| | | |
|---|---|---|
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissani (Nissensohn) |
| 7,260,366 B2 | 8/2007 | Lee et al. |
| 7,280,467 B2 | 10/2007 | Smee et al. |
| 7,280,622 B2 | 10/2007 | Love et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,321,563 B2 | 1/2008 | Kim et al. |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 | 7/2008 | Keskitalo et al. |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |
| 7,443,835 B2 | 10/2008 | Lakshmi Narayanan et al. |
| 7,447,270 B1 | 11/2008 | Hottinen |
| 7,450,532 B2 | 11/2008 | Chae et al. |
| 7,450,548 B2 | 11/2008 | Haustein et al. |
| 7,460,466 B2 | 12/2008 | Lee et al. |
| 7,463,698 B2 | 12/2008 | Fujii et al. |
| 7,468,943 B2 | 12/2008 | Gu et al. |
| 7,469,011 B2 | 12/2008 | Lin et al. |
| 7,471,963 B2 | 12/2008 | Kim et al. |
| 7,480,341 B2 | 1/2009 | Jeong et al. |
| 7,483,408 B2 | 1/2009 | Bevan et al. |
| 7,483,719 B2 | 1/2009 | Kim et al. |
| 7,486,735 B2 | 2/2009 | Dubuc et al. |
| 7,492,788 B2 | 2/2009 | Zhang et al. |
| 7,499,393 B2 | 3/2009 | Ozluturk |
| 7,508,748 B2 | 3/2009 | Kadous |
| 7,508,842 B2 | 3/2009 | Baum et al. |
| 7,512,096 B2 | 3/2009 | Kuzminskiy et al. |
| 7,545,867 B1 | 6/2009 | Lou et al. |
| 7,548,506 B2 | 6/2009 | Ma et al. |
| 7,551,546 B2 | 6/2009 | Ma et al. |
| 7,551,564 B2 | 6/2009 | Mattina |
| 7,558,293 B2 | 7/2009 | Choi et al. |
| 7,567,621 B2 | 7/2009 | Sampath et al. |
| 7,573,900 B2 | 8/2009 | Kim et al. |
| 7,599,327 B2 | 10/2009 | Zhuang |
| 7,616,955 B2 | 11/2009 | Kim |
| 7,623,442 B2 | 11/2009 | Laroia et al. |
| 7,627,051 B2 | 12/2009 | Shen et al. |
| 7,664,061 B2 | 2/2010 | Hottinen |
| 7,676,007 B1 | 3/2010 | Choi et al. |
| 7,684,507 B2 | 3/2010 | Levy |
| 7,711,330 B2 | 5/2010 | Yang et al. |
| 7,724,777 B2 | 5/2010 | Sutivong et al. |
| 7,768,979 B2 | 8/2010 | Sutivong et al. |
| 7,885,228 B2 | 2/2011 | Walton et al. |
| 7,899,497 B2 | 3/2011 | Kish et al. |
| 7,916,624 B2 | 3/2011 | Laroia et al. |
| 7,924,699 B2 | 4/2011 | Laroia et al. |
| 7,990,843 B2 | 8/2011 | Laroia et al. |
| 7,990,844 B2 | 8/2011 | Laroia et al. |
| 8,014,271 B2 | 9/2011 | Laroia et al. |
| 8,031,583 B2 | 10/2011 | Classon et al. |
| 8,045,512 B2 | 10/2011 | Khandekar et al. |
| 8,073,068 B2 | 12/2011 | Kim et al. |
| 8,095,141 B2 | 1/2012 | Teague |
| 8,098,568 B2 | 1/2012 | Laroia et al. |
| 8,098,569 B2 | 1/2012 | Laroia et al. |
| 8,199,634 B2 | 6/2012 | Laroia et al. |
| 8,218,425 B2 | 7/2012 | Laroia et al. |
| 8,223,627 B2 | 7/2012 | Laroia et al. |
| 8,462,859 B2 | 6/2013 | Sampath et al. |
| 8,477,684 B2 | 7/2013 | Khandekar et al. |
| 2001/0021180 A1 | 9/2001 | Lee et al. |
| 2001/0024427 A1 | 9/2001 | Suzuki |
| 2001/0030948 A1 | 10/2001 | Tiedemann, Jr. |
| 2001/0053140 A1 | 12/2001 | Choi et al. |
| 2001/0055294 A1 | 12/2001 | Motoyoshi |
| 2002/0015405 A1 | 2/2002 | Sepponen et al. |
| 2002/0018157 A1 | 2/2002 | Zhang et al. |
| 2002/0044524 A1 | 4/2002 | Laroia et al. |
| 2002/0061742 A1 | 5/2002 | Lapaille et al. |
| 2002/0077152 A1 | 6/2002 | Johnson et al. |
| 2002/0085521 A1 | 7/2002 | Tripathi et al. |
| 2002/0090004 A1 | 7/2002 | Rinchiuso |
| 2002/0090024 A1 | 7/2002 | Tan |
| 2002/0122400 A1 | 9/2002 | Vayanos et al. |
| 2002/0128035 A1 | 9/2002 | Jokinen et al. |
| 2002/0159422 A1 | 10/2002 | Li et al. |
| 2002/0160781 A1 | 10/2002 | Bark et al. |
| 2002/0168946 A1 | 11/2002 | Aizawa et al. |
| 2002/0172293 A1 | 11/2002 | Kuchi et al. |
| 2002/0176398 A1 | 11/2002 | Nidda |
| 2002/0193146 A1 | 12/2002 | Wallace et al. |
| 2003/0002464 A1 | 1/2003 | Rezaiifar et al. |
| 2003/0027579 A1 | 2/2003 | Sydon |
| 2003/0035491 A1 | 2/2003 | Walton et al. |
| 2003/0040283 A1 | 2/2003 | Kawai et al. |
| 2003/0043732 A1 | 3/2003 | Walton et al. |
| 2003/0043764 A1 | 3/2003 | Kim et al. |
| 2003/0063579 A1 | 4/2003 | Lee |
| 2003/0068983 A1 | 4/2003 | Kim et al. |
| 2003/0072280 A1 | 4/2003 | McFarland et al. |
| 2003/0072395 A1 | 4/2003 | Jia et al. |
| 2003/0073409 A1 | 4/2003 | Nobukiyo et al. |
| 2003/0073464 A1* | 4/2003 | Giannakis et al. ........... 455/562 |
| 2003/0076890 A1 | 4/2003 | Hochwald et al. |
| 2003/0086393 A1 | 5/2003 | Vasudevan et al. |
| 2003/0096579 A1 | 5/2003 | Ito et al. |
| 2003/0103520 A1 | 6/2003 | Chen et al. |
| 2003/0112745 A1 | 6/2003 | Zhuang et al. |
| 2003/0123414 A1 | 7/2003 | Tong et al. |
| 2003/0125040 A1 | 7/2003 | Walton et al. |
| 2003/0137955 A1 | 7/2003 | Kim et al. |
| 2003/0142648 A1 | 7/2003 | Semper |
| 2003/0147371 A1 | 8/2003 | Choi et al. |

(56) References Cited

U.S. PATENT DOCUMENTS

| | | |
|---|---|---|
| 2003/0181170 A1 | 9/2003 | Sim |
| 2003/0185310 A1 | 10/2003 | Ketchum et al. |
| 2003/0190897 A1 | 10/2003 | Lei et al. |
| 2003/0193915 A1 | 10/2003 | Lee et al. |
| 2003/0202491 A1 | 10/2003 | Tiedemann, Jr. et al. |
| 2003/0228850 A1 | 12/2003 | Hwang |
| 2003/0235255 A1 | 12/2003 | Ketchum et al. |
| 2004/0002364 A1 | 1/2004 | Trikkonen et al. |
| 2004/0015692 A1 | 1/2004 | Green et al. |
| 2004/0017785 A1 | 1/2004 | Zelst |
| 2004/0048609 A1 | 3/2004 | Kosaka |
| 2004/0058687 A1 | 3/2004 | Kim et al. |
| 2004/0066761 A1 | 4/2004 | Giannakis et al. |
| 2004/0066772 A1 | 4/2004 | Moon et al. |
| 2004/0072565 A1 | 4/2004 | Nobukiyo et al. |
| 2004/0076185 A1 | 4/2004 | Kim et al. |
| 2004/0077345 A1 | 4/2004 | Turner et al. |
| 2004/0077379 A1 | 4/2004 | Smith et al. |
| 2004/0081195 A1 | 4/2004 | El-Maleh et al. |
| 2004/0087325 A1 | 5/2004 | Cheng et al. |
| 2004/0097215 A1 | 5/2004 | Abe et al. |
| 2004/0098505 A1 | 5/2004 | Clemmensen |
| 2004/0105489 A1 | 6/2004 | Kim et al. |
| 2004/0114618 A1 | 6/2004 | Tong et al. |
| 2004/0120411 A1 | 6/2004 | Walton et al. |
| 2004/0125792 A1 | 7/2004 | Bradbury et al. |
| 2004/0136344 A1 | 7/2004 | Kim et al. |
| 2004/0136349 A1 | 7/2004 | Walton et al. |
| 2004/0156328 A1 | 8/2004 | Walton et al. |
| 2004/0160914 A1 | 8/2004 | Sarkar |
| 2004/0160933 A1 | 8/2004 | Odenwalder et al. |
| 2004/0166867 A1 | 8/2004 | Hawe |
| 2004/0166887 A1 | 8/2004 | Laroia et al. |
| 2004/0170152 A1 | 9/2004 | Nagao et al. |
| 2004/0170157 A1 | 9/2004 | Kim et al. |
| 2004/0171384 A1 | 9/2004 | Holma et al. |
| 2004/0179480 A1 | 9/2004 | Attar et al. |
| 2004/0179494 A1 | 9/2004 | Attar et al. |
| 2004/0179627 A1 | 9/2004 | Ketchum et al. |
| 2004/0181569 A1 | 9/2004 | Attar et al. |
| 2004/0185792 A1 | 9/2004 | Alexiou et al. |
| 2004/0202257 A1 | 10/2004 | Mehta et al. |
| 2004/0208138 A1 | 10/2004 | Hayashi et al. |
| 2004/0219819 A1 | 11/2004 | Di Mascio |
| 2004/0219919 A1 | 11/2004 | Whinnett et al. |
| 2004/0224711 A1 | 11/2004 | Panchal et al. |
| 2004/0228313 A1 | 11/2004 | Cheng et al. |
| 2004/0240419 A1 | 12/2004 | Abrishamkar et al. |
| 2004/0240572 A1 | 12/2004 | Brutel et al. |
| 2004/0248604 A1 | 12/2004 | Vaidyanathan |
| 2004/0252529 A1 | 12/2004 | Huber et al. |
| 2004/0252629 A1 | 12/2004 | Hasegawa et al. |
| 2004/0252655 A1 | 12/2004 | Lim et al. |
| 2004/0252662 A1 | 12/2004 | Cho |
| 2004/0257979 A1 | 12/2004 | Ro et al. |
| 2004/0264507 A1 | 12/2004 | Cho et al. |
| 2004/0264593 A1 | 12/2004 | Shim et al. |
| 2004/0267778 A1 | 12/2004 | Rudolph et al. |
| 2005/0002412 A1 | 1/2005 | Sagfors et al. |
| 2005/0002440 A1 | 1/2005 | Alamouti et al. |
| 2005/0002468 A1 | 1/2005 | Walton et al. |
| 2005/0003782 A1 | 1/2005 | Wintzell |
| 2005/0008091 A1 | 1/2005 | Boutros et al. |
| 2005/0009476 A1 | 1/2005 | Wu et al. |
| 2005/0009486 A1 | 1/2005 | Al-Dhahir et al. |
| 2005/0013263 A1 | 1/2005 | Kim et al. |
| 2005/0030886 A1 | 2/2005 | Wu et al. |
| 2005/0031044 A1 | 2/2005 | Gesbert et al. |
| 2005/0034079 A1 | 2/2005 | Gunasekar et al. |
| 2005/0041611 A1 | 2/2005 | Sandhu |
| 2005/0041618 A1 | 2/2005 | Wei et al. |
| 2005/0041775 A1 | 2/2005 | Batzinger et al. |
| 2005/0044206 A1 | 2/2005 | Johansson et al. |
| 2005/0047517 A1 | 3/2005 | Georgios et al. |
| 2005/0052991 A1* | 3/2005 | Kadous .................. 370/216 |
| 2005/0053081 A1 | 3/2005 | Andersson et al. |
| 2005/0063298 A1 | 3/2005 | Ling et al. |
| 2005/0068921 A1 | 3/2005 | Liu |
| 2005/0073976 A1 | 4/2005 | Fujii |
| 2005/0084000 A1 | 4/2005 | Krauss et al. |
| 2005/0085236 A1 | 4/2005 | Gerlach et al. |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0135499 A1 | 6/2005 | Nam et al. |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath, Jr. et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195733 A1* | 9/2005 | Walton et al. .................. 370/208 |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0207367 A1 | 9/2005 | Onggosanusi et al. |
| 2005/0215196 A1 | 9/2005 | Krishnan et al. |
| 2005/0220211 A1 | 10/2005 | Shim et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254467 A1 | 11/2005 | Li et al. |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0265470 A1 | 12/2005 | Kishigami et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong et al. |
| 2006/0018347 A1 | 1/2006 | Agrawal |
| 2006/0018397 A1 | 1/2006 | Sampath et al. |
| 2006/0023745 A1 | 2/2006 | Koo et al. |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1* | 2/2006 | Yun et al. .................. 375/299 |
| 2006/0040655 A1 | 2/2006 | Kim |
| 2006/0050770 A1* | 3/2006 | Wallace et al. .................. 375/144 |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0089104 A1 | 4/2006 | Kaikkonen et al. |
| 2006/0092054 A1 | 5/2006 | Li et al. |
| 2006/0093062 A1 | 5/2006 | Yun et al. |
| 2006/0104333 A1 | 5/2006 | Rainbolt et al. |
| 2006/0104381 A1* | 5/2006 | Menon et al. .................. 375/267 |
| 2006/0107171 A1 | 5/2006 | Skraparlis |
| 2006/0111054 A1 | 5/2006 | Pan et al. |
| 2006/0114858 A1 | 6/2006 | Walton et al. |
| 2006/0120469 A1 | 6/2006 | Maltsev et al. |
| 2006/0120471 A1 | 6/2006 | Learned et al. |
| 2006/0126491 A1 | 6/2006 | Ro et al. |

(56) References Cited

U.S. PATENT DOCUMENTS

| | | |
|---|---|---|
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0209980 A1 | 9/2006 | Kim et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0233222 A1 | 10/2006 | Reial et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0280114 A1 | 12/2006 | Osseiran et al. |
| 2006/0285485 A1 | 12/2006 | Agrawal et al. |
| 2006/0285515 A1 | 12/2006 | Julian et al. |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0005749 A1 | 1/2007 | Sampath |
| 2007/0009011 A1 | 1/2007 | Coulson |
| 2007/0019596 A1 | 1/2007 | Barriac et al. |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0070952 A1 | 3/2007 | Yoon et al. |
| 2007/0071147 A1 | 3/2007 | Sampath et al. |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |
| 2008/0063099 A1 | 3/2008 | Laroia et al. |
| 2008/0080641 A1 | 4/2008 | Kim |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0209115 A1 | 8/2008 | Maeda et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0129501 A1* | 5/2009 | Mehta et al. ............... 375/299 |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0002570 A9* | 1/2010 | Walton et al. ............... 370/208 |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2013/0016678 A1 | 1/2013 | Laroia et al. |
| 2013/0208681 A1 | 8/2013 | Gore et al. |
| 2013/0287138 A1 | 10/2013 | Ma et al. |
| 2013/0315200 A1 | 11/2013 | Gorokhov et al. |
| 2014/0247898 A1 | 9/2014 | Laroia et al. |
| 2014/0376518 A1 | 12/2014 | Palanki et al. |

FOREIGN PATENT DOCUMENTS

| | | |
|---|---|---|
| CA | 2348137 | 11/2001 |
| CA | 2400517 | 4/2003 |
| CA | 2477536 | 9/2003 |
| CA | 2540688 | 5/2005 |
| CA | 2577369 | 3/2006 |
| CL | 19931400 | 12/1994 |
| CL | 8461997 | 1/1998 |
| CL | 009531997 | 1/1998 |
| CL | 27102004 | 8/2005 |
| CL | 22892004 | 9/2005 |
| CL | 30862004 | 10/2005 |
| CL | 29932005 | 5/2006 |
| CL | 15202006 | 12/2006 |
| CL | 22032006 | 2/2007 |
| CL | 15212006 | 3/2007 |
| CL | 14922006 | 4/2007 |
| CL | 14892006 | 5/2007 |
| CL | 14902006 | 5/2007 |
| CL | 29032006 | 5/2007 |

(56) References Cited

FOREIGN PATENT DOCUMENTS

| | | |
|---|---|---|
| CL | 29062006 | 5/2007 |
| CL | 29042006 | 6/2007 |
| CL | 29022006 | 7/2007 |
| CL | 29082006 | 10/2007 |
| CL | 46151 | 12/2009 |
| CL | 29012006 | 1/2010 |
| CL | 29072006 | 1/2010 |
| CN | 1252919 | 5/2000 |
| CN | 1267437 A | 9/2000 |
| CN | 1284795 | 2/2001 |
| CN | 1296682 | 5/2001 |
| CN | 1344451 A | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 A | 1/2004 |
| CN | 1487755 A | 4/2004 |
| CN | 1520220 | 8/2004 |
| CN | 1525678 | 9/2004 |
| CN | 1636346 A | 7/2005 |
| CN | 1642051 A | 7/2005 |
| CN | 1642335 A | 7/2005 |
| CN | 1647436 | 7/2005 |
| DE | 19800953 C1 | 7/1999 |
| DE | 19957288 C1 | 5/2001 |
| DE | 10240138 | 8/2003 |
| DE | 10254384 | 6/2004 |
| EP | 0488976 | 6/1992 |
| EP | 0568291 A2 | 11/1993 |
| EP | 0740431 A1 | 10/1996 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1172983 A2 | 1/2002 |
| EP | 1180907 A2 | 2/2002 |
| EP | 1187506 A1 | 3/2002 |
| EP | 1204217 A1 | 5/2002 |
| EP | 1255369 | 11/2002 |
| EP | 1267513 | 12/2002 |
| EP | 1074099 B1 | 2/2003 |
| EP | 1286490 A2 | 2/2003 |
| EP | 1335504 A2 | 8/2003 |
| EP | 1351538 B1 | 10/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1542488 A1 | 6/2005 |
| EP | 1601149 A2 | 11/2005 |
| EP | 1643669 A1 | 4/2006 |
| EP | 1655874 A2 | 5/2006 |
| EP | 1538863 A1 | 6/2006 |
| EP | 1898542 A1 | 3/2008 |
| EP | 1941693 | 7/2011 |
| FR | 2584884 | 1/1987 |
| GB | 2279540 A | 1/1995 |
| GB | 2348776 A | 10/2000 |
| GB | 2412541 | 9/2005 |
| IL | 167573 | 2/2011 |
| IL | 201872 | 5/2012 |
| JP | H04111544 A | 4/1992 |
| JP | 4301931 A | 10/1992 |
| JP | H0746248 A | 2/1995 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | H11504169 A | 4/1999 |
| JP | H11168453 A | 6/1999 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000022618 A | 1/2000 |
| JP | 2000102065 A | 4/2000 |
| JP | 2000184425 | 6/2000 |
| JP | 2000209137 A | 7/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002111556 A | 4/2002 |
| JP | 2002515203 T | 5/2002 |
| JP | 2002217752 | 8/2002 |
| JP | 2002290148 A | 10/2002 |
| JP | 2002534925 A | 10/2002 |
| JP | 2002534941 | 10/2002 |
| JP | 2002538696 A | 11/2002 |
| JP | 200318054 | 1/2003 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 2003174426 | 6/2003 |
| JP | 2003199173 A | 7/2003 |
| JP | 2003520523 | 7/2003 |
| JP | 2003235072 A | 8/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2003536308 A | 12/2003 |
| JP | 2004007643 | 1/2004 |
| JP | 2004023716 | 1/2004 |
| JP | 2004048716 A | 2/2004 |
| JP | 200472457 | 3/2004 |
| JP | 2004072157 A | 3/2004 |
| JP | 2004096142 | 3/2004 |
| JP | 2004507151 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |

(56) References Cited

FOREIGN PATENT DOCUMENTS

| | | | |
|---|---|---|---|
| JP | 2004215022 A | 7/2004 | |
| JP | 2004221972 | 8/2004 | |
| JP | 2004266818 | 9/2004 | |
| JP | 2004529524 T | 9/2004 | |
| JP | 2004297276 A | 10/2004 | |
| JP | 2004297370 A | 10/2004 | |
| JP | 2004297756 | 10/2004 | |
| JP | 2004320434 | 11/2004 | |
| JP | 2004534456 | 11/2004 | |
| JP | 2004535106 A | 11/2004 | |
| JP | 2005006337 | 1/2005 | |
| JP | 2005020530 | 1/2005 | |
| JP | 2005502218 A | 1/2005 | |
| JP | 2005506757 A | 3/2005 | |
| JP | 2005110130 A | 4/2005 | |
| JP | 2005509316 A | 4/2005 | |
| JP | 2005509359 | 4/2005 | |
| JP | 2005130491 A | 5/2005 | |
| JP | 2005167502 A | 6/2005 | |
| JP | 2005197772 | 7/2005 | |
| JP | 2005203961 | 7/2005 | |
| JP | 2005521327 | 7/2005 | |
| JP | 2005521358 | 7/2005 | |
| JP | 2005223450 | 8/2005 | |
| JP | 2005236678 A | 9/2005 | |
| JP | 2006505172 | 2/2006 | |
| JP | 2006505230 A | 2/2006 | |
| JP | 2006506860 A | 2/2006 | |
| JP | 2006211537 A | 8/2006 | |
| JP | 2006518173 A | 8/2006 | |
| JP | 2006524930 A | 11/2006 | |
| JP | 2007500486 A | 1/2007 | |
| JP | 2007503790 | 2/2007 | |
| JP | 2007519281 | 7/2007 | |
| JP | 2007525043 A | 8/2007 | |
| JP | 2007527127 | 9/2007 | |
| JP | 2008505587 A | 2/2008 | |
| JP | 2008535398 | 8/2008 | |
| JP | 4188372 B2 | 11/2008 | |
| JP | 2008546314 | 12/2008 | |
| JP | 04694628 | 6/2011 | |
| KR | 0150275 B1 | 6/1998 | |
| KR | 20000060428 | 10/2000 | |
| KR | 100291476 B1 | 3/2001 | |
| KR | 20010056333 | 4/2001 | |
| KR | 20010087715 A | 9/2001 | |
| KR | 20030007965 | 1/2003 | |
| KR | 20030035969 A | 5/2003 | |
| KR | 20030062135 A | 7/2003 | |
| KR | 20040063057 | 7/2004 | |
| KR | 200471652 | 8/2004 | |
| KR | 20040103441 A | 12/2004 | |
| KR | 20050015731 | 2/2005 | |
| KR | 20050063826 A | 6/2005 | |
| KR | 100606099 | 7/2006 | |
| KR | 101046824 | 6/2011 | |
| RU | 95121152 | 12/1997 | |
| RU | 2141168 | 11/1999 | |
| RU | 2141706 C1 | 11/1999 | |
| RU | 2159007 C2 | 11/2000 | |
| RU | 2162275 C2 | 1/2001 | |
| RU | 2183387 C2 | 6/2002 | |
| RU | 2192094 | 10/2002 | |
| RU | 2197778 C2 | 1/2003 | |
| RU | 2201033 C2 | 3/2003 | |
| RU | 2207723 C1 | 6/2003 | |
| RU | 2208911 | 7/2003 | |
| RU | 2208913 | 7/2003 | |
| RU | 2210866 C2 | 8/2003 | |
| RU | 2216101 C2 | 11/2003 | |
| RU | 2216103 C2 | 11/2003 | |
| RU | 2216105 C2 | 11/2003 | |
| RU | 2225080 C2 | 2/2004 | |
| RU | 2235429 | 8/2004 | |
| RU | 2235432 C2 | 8/2004 | |
| RU | 2237379 C2 | 9/2004 | |
| RU | 2238611 C1 | 10/2004 | |
| RU | 2242091 C2 | 12/2004 | |
| RU | 2003125268 | 2/2005 | |
| RU | 2250564 | 4/2005 | |
| RU | 2257008 | 7/2005 | |
| RU | 2257609 | 7/2005 | |
| RU | 2264010 | 11/2005 | |
| RU | 2267224 | 12/2005 | |
| RU | 2005129079 A | 2/2006 | |
| RU | 2285338 C2 | 10/2006 | |
| RU | 2285351 C2 | 10/2006 | |
| RU | 2292655 | 1/2007 | |
| RU | 2335864 C2 | 10/2008 | |
| RU | 2349043 C2 | 3/2009 | |
| SU | 1320883 | 6/1987 | |
| TW | 508960 | 11/2002 | |
| TW | 510132 | 11/2002 | |
| TW | 200302642 | 8/2003 | |
| TW | 200401572 | 1/2004 | |
| TW | I231666 | 4/2005 | |
| TW | I232040 | 5/2005 | |
| TW | 248266 | 1/2006 | |
| TW | 200718128 | 5/2007 | |
| WO | WO9408432 | 4/1994 | |
| WO | WO95021494 | 8/1995 | |
| WO | WO9613920 A1 | 5/1996 | |
| WO | WO-9622662 A1 | 7/1996 | |
| WO | WO9701256 | 1/1997 | |
| WO | WO9737456 A2 | 10/1997 | |
| WO | WO9746033 A2 | 12/1997 | |
| WO | WO9800946 | 1/1998 | |
| WO | WO98014026 | 4/1998 | |
| WO | WO9837706 A2 | 8/1998 | |
| WO | WO9848581 A1 | 10/1998 | |
| WO | WO9853561 | 11/1998 | |
| WO | WO9854919 | 12/1998 | |
| WO | WO9941871 A1 | 8/1999 | |
| WO | WO9944313 | 9/1999 | |
| WO | WO9944383 A1 | 9/1999 | |
| WO | WO9952250 A1 | 10/1999 | |
| WO | WO9953713 | 10/1999 | |
| WO | WO9959265 | 11/1999 | |
| WO | WO9960729 A1 | 11/1999 | |
| WO | 0004728 | 1/2000 | |
| WO | WO-0001362 A1 | 1/2000 | |
| WO | WO0002397 | 1/2000 | |
| WO | WO0033503 | 6/2000 | |
| WO | 0051389 A1 | 8/2000 | |
| WO | WO0070897 | 11/2000 | |
| WO | WO0101596 | 1/2001 | |
| WO | WO0117125 A1 | 3/2001 | |
| WO | WO0126269 | 4/2001 | |
| WO | WO0139523 A2 | 5/2001 | |
| WO | WO0145300 | 6/2001 | |
| WO | WO0148969 A2 | 7/2001 | |
| WO | WO0158054 A1 | 8/2001 | |
| WO | WO0160106 | 8/2001 | |
| WO | 0165637 A2 | 9/2001 | |
| WO | WO0169814 A1 | 9/2001 | |
| WO | WO0182543 | 11/2001 | |
| WO | WO0182544 A1 | 11/2001 | |
| WO | WO0189112 A1 | 11/2001 | |
| WO | 0195427 A2 | 12/2001 | |
| WO | WO0193505 | 12/2001 | |
| WO | WO0204936 A1 | 1/2002 | |
| WO | WO0207375 | 1/2002 | |
| WO | 0215432 A1 | 2/2002 | |
| WO | WO0215616 | 2/2002 | |
| WO | WO0219746 A1 | 3/2002 | |
| WO | WO-0225857 A1 | 3/2002 | |
| WO | WO0231991 | 4/2002 | |
| WO | WO0233848 A2 | 4/2002 | |
| WO | 0245293 A2 | 6/2002 | |
| WO | WO0245456 A1 | 6/2002 | |
| WO | WO0249305 A2 | 6/2002 | |
| WO | WO0249306 A2 | 6/2002 | |
| WO | WO0249385 A2 | 6/2002 | |
| WO | WO02060138 | 8/2002 | |

(56) References Cited

FOREIGN PATENT DOCUMENTS

| | | |
|---|---|---|
| WO | WO02065675 | 8/2002 |
| WO | WO02082689 A2 | 10/2002 |
| WO | WO02082743 A2 | 10/2002 |
| WO | WO-2002078211 | 10/2002 |
| WO | WO02089434 A1 | 11/2002 |
| WO | WO02093782 A1 | 11/2002 |
| WO | WO02093819 A1 | 11/2002 |
| WO | WO02100027 A1 | 12/2002 |
| WO | WO03001696 A2 | 1/2003 |
| WO | WO03001761 A1 | 1/2003 |
| WO | WO03003617 | 1/2003 |
| WO | WO03019819 | 3/2003 |
| WO | WO03030414 | 4/2003 |
| WO | WO03034644 A1 | 4/2003 |
| WO | WO03043262 | 5/2003 |
| WO | WO03043369 | 5/2003 |
| WO | 03049409 A2 | 6/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | WO03073646 | 9/2003 |
| WO | WO03075479 A1 | 9/2003 |
| WO | WO03085876 | 10/2003 |
| WO | WO03088538 A1 | 10/2003 |
| WO | WO03094384 | 11/2003 |
| WO | 2004002011 A1 | 12/2003 |
| WO | WO03103331 | 12/2003 |
| WO | WO04002047 | 12/2003 |
| WO | WO2004004370 | 1/2004 |
| WO | WO2004008671 | 1/2004 |
| WO | WO2004008681 A1 | 1/2004 |
| WO | WO2004015912 | 2/2004 |
| WO | WO2004016007 | 2/2004 |
| WO | WO-04019447 | 3/2004 |
| WO | WO2004021605 A1 | 3/2004 |
| WO | WO2004023834 A1 | 3/2004 |
| WO | 2004028037 A1 | 4/2004 |
| WO | WO2004030238 A1 | 4/2004 |
| WO | WO2004032443 A1 | 4/2004 |
| WO | 2004038984 A2 | 5/2004 |
| WO | 2004040825 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 | 6/2004 |
| WO | WO2004049618 A1 | 6/2004 |
| WO | WO2004051872 A2 | 6/2004 |
| WO | 2004056022 A2 | 7/2004 |
| WO | WO2004062255 | 7/2004 |
| WO | WO2004064294 | 7/2004 |
| WO | WO2004064295 | 7/2004 |
| WO | WO2004066520 | 8/2004 |
| WO | WO2004068721 A2 | 8/2004 |
| WO | WO2004073276 | 8/2004 |
| WO | WO2004075023 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004077850 A2 | 9/2004 |
| WO | WO2004084509 | 9/2004 |
| WO | WO-04086712 | 10/2004 |
| WO | WO2004086706 A1 | 10/2004 |
| WO | WO2004086711 | 10/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 A2 | 11/2004 |
| WO | WO2004102816 A2 | 11/2004 |
| WO | 2004114564 A1 | 12/2004 |
| WO | 2004114615 A1 | 12/2004 |
| WO | WO2004105272 A1 | 12/2004 |
| WO | WO-2004107693 A1 | 12/2004 |
| WO | WO2004114549 | 12/2004 |
| WO | WO2005002253 A1 | 1/2005 |
| WO | 2005011163 A1 | 2/2005 |
| WO | 2005018270 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | WO2005020488 A1 | 3/2005 |
| WO | WO2005020490 | 3/2005 |
| WO | WO2005022811 A2 | 3/2005 |
| WO | WO2005025110 A2 | 3/2005 |
| WO | WO2005032004 A1 | 4/2005 |
| WO | 2005043780 A1 | 5/2005 |
| WO | WO-2005041441 A1 | 5/2005 |
| WO | WO2005043855 | 5/2005 |
| WO | WO2005046080 | 5/2005 |
| WO | 2005055465 A1 | 6/2005 |
| WO | WO-05060144 | 6/2005 |
| WO | WO-2005053186 A1 | 6/2005 |
| WO | WO2005055484 A1 | 6/2005 |
| WO | WO2005055527 | 6/2005 |
| WO | WO2005060192 A1 | 6/2005 |
| WO | WO2005065062 A2 | 7/2005 |
| WO | WO2005069538 A1 | 7/2005 |
| WO | WO2005074184 A2 | 8/2005 |
| WO | 2005086440 A1 | 9/2005 |
| WO | WO2005096538 | 10/2005 |
| WO | WO-2005107125 | 11/2005 |
| WO | WO-2005109717 A1 | 11/2005 |
| WO | WO2005122628 | 12/2005 |
| WO | 2006007292 A2 | 1/2006 |
| WO | WO2006019710 | 2/2006 |
| WO | WO2006026344 | 3/2006 |
| WO | WO-2006028204 A1 | 3/2006 |
| WO | WO-2006030867 A1 | 3/2006 |
| WO | WO2006044487 | 4/2006 |
| WO | 2006062356 A1 | 6/2006 |
| WO | 2006069301 | 6/2006 |
| WO | WO-2006059566 A1 | 6/2006 |
| WO | WO2006069300 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | 2007022430 A2 | 2/2007 |
| WO | WO-2007024913 A1 | 3/2007 |
| WO | WO2007024934 | 3/2007 |
| WO | WO2007025160 | 3/2007 |
| WO | WO2007051159 | 5/2007 |
| WO | WO-2008050996 A2 | 5/2008 |
| WO | WO-2008058112 A2 | 5/2008 |

OTHER PUBLICATIONS

3rd Generation Partnership Project; Technical Specification Group Radio Access Network; Physical Layer Aspects for Evolved UTRA (Release 7), 3GPP TR 25814 v031 (Nov. 2005) pp. 1-57.
Alcatel-Lucent, et al., "Dedicated Reference Signals for Precoding in E-UTRA Downlink" 3GPP Draft; R1-071718, 3rd Generation Partnership Project (3GPP), Mobile Competence Centre ; 650, Route Des Lucioles ; F-06921 Sophia-Antipolis Cedex ; France, vol. RAN WG1, No. St. Julian; Apr. 3, 2007, XP050105640 [retrieved on Apr. 3, 2007].
Bahai, Saltzberg: "System Architecture," Multi-Carrier Digital Communications, Kluwer Academic, New York, NY, XP-002199501, 1999, pp. 17-21.

(56) References Cited

OTHER PUBLICATIONS

Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Bingham: "Other Types of MCM," ADSL, VDSL, and Multicarrier Modulation, John Wiley & Sons, New York, XP-002199502. 2000, pp. 111-113.
Blum, R. et al., "On Optimum MIMO with Antenna Selection," IEEE International Conference on Communications: Conference Proceedings, vol. 1, Apr. 28, 2002, pp. 386-390.
Catreux, S. et al., "Simulation results for an interference-limited multiple input multiple output cellular system," Global Telecommunications Conference, 2000. GLOBECOM '00. IEEE. Dec. 1, 2000. vol. 2, pp. 1094-1096, http://ieeexplore.ieee.org/ie15/7153/19260/00891306.pdf"tp=&isnumber=19260&arnumber=8913063&punumber=7153.
Chennakeshu, et al. "Capacity Analysis of a TDMA-Based Slow-Frequency-Hopped Cellular System," IEEE Transaction on Vehicular Technology, vol. 45., No. 3, Aug. 1, 1996, pp. 531-542, XP000612951.
Chiani, et al., "Outage Evaluation for Slow Frequency-Hopping Mobile Radio Systems" IEEE Transactions on Communications, vol. 47, No. 12 Dec. 1999, pp. 1865-1874.
Choi, et al., "Design of the Optimum Pilot Pattern for Channel Estimation in OFDM Systems," Global Telecommunications Conference, IEEE Communications Society, Globecom, Dallas, Texas (2004), p. 3661-3665.
Chung, S. et al., "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Czylwik: "Comparison Between Adaptive OFDM and Single Carrier Modulation with Frequency Domain Equalization," IEEE 47th Vehicular Technology Conference, vol. 2, May 4-7, 1997, pp. 865-869.
Dai, Y. et al., "A List Sphere Decoder based turbo receiver for groupwise space time trellis coded (GSTTC) systems," 2004 IEEE 59th Vehicular Technology Conference, vol. 2, pp. 804-808, May 17, 2004, doi: 10.1109/VETECS.2004.1388940.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Das, Arnab, et al. "Adaptive, asynchronous incremental redundancy (A-IR) with fixed transmission time intervals TTI for HSDPA." IEEE, Personal, Indoor and Mobile Radio Communications, 2002. The 13th IEEE International Symposium on, pp. 1083-1087.
Das et al., "On the Reverse Link Interference Structure for Next Generation Cellular Systems," Global Telecommunications Conference, 2004. GLOBECOM '04, IEEE, vol. 5 IEEE Nov. 29-Dec. 3, 2004, pp. 3068-3072.
Dierks, et al., "The TLS Protocol", Version 1.0, Network Working Group, Request for Comments 2246, pp. 1-80 (Jan. 1999).
Digital cellular telecommunications system (Phase 2+); Mobile radio interface layer 3 specification (GSM 04.08 version 7.7.1 Release 1998); ETSI EN 300 940 V7.7.1 (Oct. 2000), pp. 1,2,91-93.
Dinis, R. et al.: "A Multiple Access Scheme for the Uplink of Broadband Wireless Systems," Global Telecommunications Conference, 2004. GLOBECOM '04. IEEE Dallas, TX, USA Nov. 29-Dec. 3, 2004, vol. 6, pp. 3808-3812, XP010758449 Piscataway, NJ, USA, IEEE.
Don Torrieri, "Cellular Frequency-Hopping CDMA Systems," IEEE Vehicular Technology Conference, May 16, 1999, pp. 919-925, vol. 2.
El Gamal, H. et al., "Universal Space-Time Coding," IEEE Transactions on Information Theory, vol. 49, Issue 5, pp. 1097-1119, XP011074756, ISSN: 0018-9448, May 2003.
European Search Report—EP10184156—Search Authority—Munich—Jun. 14, 2012.

Favre et al: "Self-Adaptive Transmission Procedure" IBM Technical Disclosure Bulletin, IBM Corporation, Sep. 1976, vol. 19, No. 4, pp. 1283-1284, New York, New York.
Fuchs, et al., "A Novel Tree-Based Scheduling Algorithm for the Downlink of Multi-User MIMO Systems with ZF Beamforming," IEEE International Conference on Acoustics, Speech, and Signal Processing, Philadelphia, pp. 1121-1124, Mar. 18-23, 2005.
Groe, J., et al., "CDMA Mobile Radio Design," Sep. 26, 2001, Artech House, Inc. Norwood, MA, pp. 257-259.
Guo, K. Et al., "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Hermann Rohling et al., : "Performance Comparison of Different Multiple Access Schemes for the Downlink of an OFDM Communication System", Vehicular Technology Conference, 1997, 47th IEEE, vol. 3, May 3-7, 1997, pp. 1365-1369.
Hill, et al., "Cyclic Shifting and Time Inversion of Partial Transmit Sequences to Reduce the Peak-to-Average Power Ratio in OFDM," IEEE International Symposium on Personal, Indoor and Mobile Radio Communications, vol. 2, Sep. 18, 2000, Piscataway, NJ, pp. 1256-1259.
Hochwald, B. et al., "Achieving near-capacity on a multiple-antenna channel," IEEE Transactions on Communications, IEEE Service Center, Piscataway, New Jersey, vol. 51, No. 3, pp. 389-399 (2003).
Hui Won Je et al, "A Novel Multiple Access Scheme for Uplink Cellular Systems," Vehicular Technology Conference, 2004, VTC2004-fall, 2004 IEEE 60th Los Angeles, CA, US, Sep. 26-29, 2004, Piscataway, NY, pp. 984-988.
International Search Report—PCT/US06/032900, International Search Authority—European Patent Office, May 3, 2007.
"Introduction to cdma2000 Standards for Spread Spectrum Systems",TIA/EIA/IS-2000 Standards for CDMA2000 Spread Spectrum Systems 3GPP2 C.S0001-0 Version 1.0, Jul. 1999, 16 pages.
John B. Groe, Lawrence E. Larson, "CDMA Mobile Radio Design" Sep. 26, 2001, Artech House, Norwood, MA02062 580530, XP002397967, pp. 157-159.
J.S. Chow and J.M. Cioffi: "A cost-effective maximum likelihood reciever for multicarrier systems", Proc. IEEE Int. Conf. On Comm., pp. 948-952, Jun. 1992.
Kaleh: "Channel Equalization for Block Transmission Systems," IEEE Journal on Selected Areas in Communications, vol. 13, No. 1, Jan. 1995, pp. 110-121.
Kappes, J.M., and Sayegh, S.I., "Programmable Demultiplexer/Demodulator Processor," COMSAT Laboratories, IEEE, Mar. 11, 1990, pp. 230-234.
Karsten Bruninghaus et al., : "Multi-Carrier Spread Spectrum and It's relationship to Single-Carrier Transmission", Vehicular technology Conference, 1998, VTC 98, 48th IEEE, vol. 3, May 18-21, 1998, pp. 2329-2332.
Keller, et al.: "Adaptive Multicarrier Modulation: A Convenient Framework for Time-Frequency Processing in Wireless Communications," Proceedings of the IEEE, vol. 88, No. 5, May 2000, pp. 611-640.
Ken Murakami et al., "Status Toward Standardization at IEEE 802.3ah and items on the construction of GE-PON system ," Technical Report of the Institute of Electronics, Information and Communication Engineers, Jun. 13, 2003, vol. 103, No. 124, pp. 1-6, IN2003-24.
Kiessling, M. et al., "Short-term and long-term diagonalization of correlated MIMO channels with adaptive modulation" IEEE International Symposium on Personal, Indoor and Mobile Radio Communications, vol. 2, Sep. 15, 2002, pp. 593-597.
Kim, et al. "Performance of TDMA System With SFH and 2-Bit Differentially Detected GMSK Over Rayleigh Fading Channel," IEEE Vehicular Technology Conference, Apr. 28, 1996, pp. 789-794.
Kishiyama et al., Investigation of optimum pilot channel structure for VSF-OFCDM broadband wireless access in forward link, VTC

(56) References Cited

OTHER PUBLICATIONS

2003-Spring, The 57th IEEE Semiannual Vehicular Technology Conference, Proceedings JEJU, Korea, Apr. 22-25, 2003, pp. 139-144.
Kostic, et al. "Dynamic Frequency Hopping in Wireless Cellular Systems—Simulations of Full-Replacement and Reduced-Overhead Methods," IEEE Vehicular Technology Conference, May 16, 1999, pp. 914-918.
Kostic, et al. "Fundamentals of Dynamic Frequency Hopping in Cellular Systems," IEEE Journal on Selected Areas in Communications, vol. 19, No. 11, Nov. 2001, pp. 2254-2266.
Kousa, M. et al., "Adaptive Binary Coding for Diversity Communication Systems" IEEE International Conference on Personal Wireless Communications Proceedings, pp. 80-84, XP000992269, (1997).
Lacroix, et al.: "A Study of OFDM Parameters for High Data Rate Radio LAN's," 2000 IEEE 51st Vehicular Technology Conference Proceedings, vol. 2, May 15-18, 2000, pp. 1075-1079.
Laroia, R. et al: "An integrated approach based on cross-layer optimization—Designing a mobile broadband wireless access network" IEEE Signal Processing Magazine, IEEE Service Center, Piscataway, NJ, US, vol. 21, No. 5, Sep. 2004, pp. 20-28, XP011118149.
Lau, et al., "On the Design of MIMO Block-Fading Channels with Feedback-Link Capacity Constraint," IEEE Transactions on Communications, IEEE Service Center, Piscataway, NJ, US, v. 52, No. 1, Jan. 2004, pp. 62-70, XP001189908.
Leon, et al., "Cyclic Delay Diversity for Single Carrier-Cyclic Prefix Systems," Conference Record of the Thirty-Ninth Asilomar Conference on Signals, Systems and Computers, Oct. 28, 2005, Piscataway, NJ, pp. 519-523.
Lettieri et al: "Adaptive frame length control for improving wireless link throughput, range, and energy efficiency", INFOCOM 98, 17th Annual Joint Conference of the IEEE Computer and Communications Societies, Mar. 29-Apr. 2, 1998, pp. 564-571, vol. 2, IEEE San Francisco, CA, New York, New York.
Lott: "Comparison of Frequency and Time Domain Differential Modulation in an OFDM System for Wireless ATM," 1999 IEEE 49th Vehicular Technology Conference, vol. 2, Jul. 1999, pp. 877-883.
Maniatis, I. et al., "Pilots for joint channel estimation in multi-user OFDM mobile radio systems," 2002 IEEE Seventh International Symposium on Spread Spectrum Techniques and Applications, Prague, Czech Republic, Sep. 2, 2002, pp. 44-48, XP010615562.
MBFDD and MBTDD Wideband Mode: Technology Overview, IEEE C802.20-05/68r1, Jan. 6, 2006.
Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, Jun. 24, 2004, pp. 143-148, XP010782619, ISBN 0789385136, Para 3, point B.
Molisch, et al., MIMO systems with antenna selection, IEEE Microwave Magazine, Mar. 2004, pp. 46-56, XP002411128.
Naofal Al-Dhahir: "A Bandwidth-Optimized Reduced-Complexity Equalized Multicarrier Transceiver", IEEE Transactions on Communications, vol. 45, No. 8, Aug. 1997, pp. 1-17.
Naofal Al-Dhahir: "Optimum Finite-Length Equalization for Multicarrier Transceivers", IEEE Trans. On Comm., pp. 56-64, Jan. 1996.
Nassar et al., "Introduction of Carrier Interference to Spread Spectrum Multiple Access," Wireless Communications and Systems, 1999 Emerging Technologies Symposium, IEEE, Apr. 12-13, 1999, pp. 1-5.
Natarajan, et al., "High-Performance MC-CDMA via Carrier Interferometry Codes," IEEE Transactions on Vehicular Technology, 2001, vol. 50 (issue 6) pp. 1344-1353.
Nokia, "Uplink Considerations for UTRA LTE", 3GPP TSG RAN WG1#40bis, Beijing, CN, R1-050251, 3GPP, Apr. 4, 2005, pp. 1-9.
NTT DoCoMo, "Downlink Multiple Access Scheme for Evolved UTRA", 3GPP R1-050249, 3GPP, Apr. 4, 2005, pp. 1-9.
NTT DoCoMo, et al., "Orthogonal Common Pilot Channel and Scrambling Code in Evolved UTRA Downlink," 3GPP TSG RAN WG1 #42 on LTE (Original R1-050589), R1-050704, London UK, pp. 1-8, Aug. 29-Sep. 2, 2005.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Prasad, N. et al., "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.
QUALCOMM Europe: "Description and link simulations for OFDMA based E-UTRA uplink" 3GPP Draft; R1-051100, 3rd Generation Partnership Project (3GPP), Mobile Competence Centre; Sophia-Antipolis Cedex, France, vol. RAN WG1, No. San Diego, USA; Oct. 4, 2005, pp. 1-10, XP050100715.
S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.
Sandeep Chennakeshu et al., "A comparison of diversity schemes for a mixed-mode slow frequency-hopped cellular system," Global Telecommunications Conference, 1993, including a Communications Theory Mini-Conference. Technical Program Conference Record, IEEE in Houston. GLOBECOM '93., IEEE, Nov. 29, 1993, pp. 1749-1753, vol. 3.
Sari, et al., "Transmission Techniques for Digital Terrestrial TV Broadcasting," IEEE Communications Magazine, Feb. 1995, pp. 100-109.
Schnell, et al., "Application of IFDMA to Mobile Radio Transmission", IEEE 1998 International Conference on Universal Personal Communications, vol. 2, Oct. 5-9, 1998, pp. 1267-1272.
Schnell, M. et al., "A Promising New Wideband Multiple-Access Scheme for Future Mobile Communications Systems", European Transactions on Telecommunications, Jul. 1, 1999, vol. 10, No. 4, pp. 417-427, Wiley & Sons, Chichester, GB, XP009069928, ISSN: 1 124-31 8X.
Shattil et al., "Array Control Systems for Multicarrier Protocols Using a Frequency-Shifted Feedback Cavity", Radio and Wireless Conference EEE, Aug. 1-4, 1999, pp. 215-218.
Siemens, "Evolved UTRA uplink scheduling and frequency reuse" [online], 3GPP TSG-WG1 # 41 R1-050476, Internet <URL:http://www.3gpp.org/ftp/tsg_ran/WG1_RL1/TSGR1_41/Docs/R1-050476.zip>, May 9, 2005.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54,104-106.
Sorger U., et al., "Interleaved FDMA—A New Spread-Spectrum Multiple-Access Scheme, XP010284733," Communications, Conference Record, IEEE, Atlanta, GA, 1998, pp. 1013-1017.
Sumii, Kenji, et al., "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwan Search Report—TW095130842—TIPO—Jun. 18, 2011.
Taiwanese Search report—TIPO—Jul. 30, 2010.
Telecommunications Industry Association, Mobile Station-Base Station Compatibility Standard for Dual-Mode Wideband Spread Spectrum Cellular System, TIA/EIA-95, Jul. 1993, 668 pages.
Tellado, "Multicarrier Modulation with Low Par," Kluwer Academic, Dordrecht, NL, XP-002199500, 2000, pp. 6-11 and 55-60.

(56) References Cited

OTHER PUBLICATIONS

Tellambura, "Use of m-sequences for OFDM Peak-to-Average Power Ratio Reduction," Electronics Letters, vol. 33, No. 15, Jul. 17, 1997, pp. 1300-1301.
TIA-1121.001 "Physical Layer for Ultra Mobile Broadband (UMB) Air Interface Specification," 3GPP2 C.S0084-001-0, Version 2.0 (Aug. 2007).
TIA-1121.002 "Medium Access Control Layer for Ultra Mobile Broadband (UMB) Air Interface Specification," 3GPP2 C.S0084-002-0, Version 2.0 (Aug. 2007).
Tomcik, Jim: "QFDD Technology Overview Presentation," IEEE 802.20 Working Group on Mobile Broadband Wireless Access, [Online] Nov. 15, 2005, pp. 1-73, XP002467626.
Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).
Toufik, I., et al., Channel allocation algorithms for multi-carrier systems, Vehicular Technology Conference 2004, VTC2004-Fall, 2004 IEEE 60th Los Angeles, CA, USA Sep. 26-29, 2004, Piscataway, NJ, USA IEEE, Sep. 26, 2004, pp. 1129-1133, XP010786798.
Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Wang et al., "Improving performance of multi-user OFDM systems using bit-wise interleaver" Electronics Letters IEE Stevenage, GB, vol. 37. No. 19, Sep. 13, 2001, pp. 1173-1174 XP006017222.
Widdup, B. et al., "A highly-parallel VLSI architecture for a list sphere detector," IEEE International Conference, Paris, France, vol. 5, pp. 2720-2725 (2004).
Wiesel, A., et al., "Efficient implementation of sphere demodulation" Signal Processing Advances in Wireless Communications, 2003. SPAWC 200 3. 4th IEEE Workshop on Rome. Italy Jun. 15-18, 2003, Piscataway, NJ, USA, IEEE, US, Jun. 15, 2003, pp. 36-40, XP010713463.
Written Opinion—PCT/US06/032900, International Search Authority—European Patent Office, May 3, 2007.
Xiaodong, et al., "M-Sequences for OFDM Peak-to-Average Power Ratio Reduction and Error Correction," Electronics Letters, vol. 33, Issue 7, Mar. 27, 1997, pp. 554-555.
Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.
Yun et al., "Performance of an LDPC-Coded Frequency-Hopping QFDMA System Based on Resource Allocation in the Uplink" Vehicular Technology—Conference 2004. VTO 2004-Spring, 2004 IEEE 59th Milan, Italy May 17-19, 2004, Piscataway, NJ, USA, vol. 4, May 17, 2004. pp. 1925-1928. XP010766497.
Zekri, et al., "DMT Signals with Low Peak-to-Average Power Ratio," Proceedings, IEEE International Symposium on Computers and Communications, Jul. 6-8, 1999, pp. 362-368.
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Jim Tomcik, QFDD and QTDD: Technology Overview, IEEE 802.20 Working Group on Mobile Broadband Wireless Access, Oct. 28, 2005, pp. 48-50, URL: http://www.ieee802.org/20/contribs/c802.20-05-68.zip.
Nokia: "Compact signalling of multi-code allocation for HSDPA", version 2,3GPP R1-02-0018, Jan. 11, 2002.
Sethi M, et al., "Code Reuse DS-CDMA—A Space Time Approach", Proceedings of the 2002 IEEE International Conference on Acoustics, Speech, and Signal Processing (ICASSP), pp. 2297-2300, May 13-17, 2002.
Bhushan N., "UHDR Overview", C30-20060522-037, Denver, CO, May 22, 2006, pp. 1-115.
Samsung: "Uplink Transmission and Multiplexing for EUTRA", 3GPP Draft; R1-050605 UL Multiplexing, Jun. 16, 2005, XP050111420.
Tachikawa (Editor); "W-CDMA Mobile Communication Systems," John Wiley & Sons Ltd., Japan, Maruzen: pp. 82-213, Jun. 25, 2001.
LG Electronics: "PAPR comparison of uplink MA schemes", 3GPP TSG RAN WG1 Meeting #41, R1-050475, May 9-13, 2005, pp. 6.
Motorola,"Uplink Numerology and Frame Structure", 3GPP TAG RAN1 #41 Meeting R1-050397, May 13, 2005.
Samsung Electonics Co. Ltd.; "Uplink Multiple Access and Multiplexing for Evolved UTRA", R1-050439, May 3, 2005 (May 3, 2005), pp. 1-22, XP55018616, Retrieved from the Internet: URL:http://www.3gpp.org/ftp/tsg_ran/WG1_R1/TSGR1/ Docs / [retrieved on Feb. 7, 2012].
Tomcik J., "QFDD and QTDD: Proposed Draft Air Interface Specification," IEEE 0802.20-05/69, IEEE 802.20 Working Group on Mobile Broadband Wireless Access, Oct. 28, 2005, P.1-6,1-7,1-16,6-65,7-11,7-33,7-37~7-55,9-21,9-22,9-24~9-32.
Digital cellular telecommunications system (Phase 2+); General Packet Radio Service (GPRS); Mobile Station (MS)- Base Station System (BSS)interface; Radio Link Control/Medium Access Control (RLC/MAC) protocol (GSM 04.60 version 8.4.1 Release 1999), 3GPP Standard; ETSI EN 301 349, 3RD Generation Partnership Project (3GPP), Mobile Competence Centre ; 650, Route Des Lucioles ; F-06921 Sophia-Antipolis Cedex ; France, No. V8.4.1, Oct. 1, 2000 (Oct. 1, 2000), pp. 1-243, XP050358534.
3GPP TS 36.211 v0.0.0; "3rd Generation Partnership Project; Technical Specification Group Radio Access Network; Evolved UMTS Terrestrial Radio Access; Physical Channels and Modulation (Release x)," 3GPP Technical Specification, Sep. 2006.
3GPP TSG RAN WG1 #42; "MIMO OFDMA Techniques for Downlink E-UTRA," 3GPP, R1- 050724, pp. 1-6, Texas Instruments, London, UK, Aug. 29-Sep. 2, 2005.
3GPP TSG RAN WG1 #46; "Performance of per group rate control (PGRC) with advanced MIMO Receiver," 3GPP, R1-062015, pp. 1-6, Texas Instruments, Tallinn, Estonia, Aug. 28-Sep. 1, 2006.
3GPP2 C.S0084-001-0 v1.0; "3rd Generation Partnership Project 2; Physical Layer for Ultra Mobile Broadband (UMB) Air Interface Specification," 3GPP2 C.S0084-001-0 version 1.0, Apr. 5, 2007.
Andreas, et al., "MIMO systems with antenna selection," IEEE Microwave Magazine, URL:http//ieee/org/iel5/6668/28677/01284943/pdf, Retrieved on Dec. 8, 2006, pp. 36-56 (2004).
Huawei: "Double-ASTTD with Sub-Group Rate Control", 3GPP TSG-RAN WG1#38 R1-040829, Aug. 20, 2004, pp. 1-9.
Institute for Infocomm Research et al., "Intra-Node B Macro Diversity based on Cyclic Delay Transmissions", 3GPP TSG RAN WG1 #42 on LTE, R1-050795, Aug. 29-Sep. 2, 2005, pp. 1-5.
Knopp R, et al., "Power control schemes for TDD systems with multiple transmit and receive antennas" Global Telecommunications Conference-GLOBECOM '99, 1999, pp. 2326-2330, XP010373369 * the whole document *.
Kousa M, et al., "Multichannel adaptive forward error-correction system", IEEE Proceedings I. Solid-State & Electron Devices, Institution of Electrical Engineers. Stevenage, GB, vol. 140, No. 5, Part 1, Oct. 1, 1993 (Oct. 1, 1993), pp. 357-364, XP000403498, ISSN: 0956-3776.
Mui, "Successive interference cancellation for cdma2000 using a software defined radio," IEEE Wireless Communications and Networking Conference, 2006, vol. 3, pp. 1591-1596.
Sommer D., et al., "Coherent OFDM transmission at 60 GHz", Vehicular Technology Conference, 1999, VTC 1999—Fall, IEEE VTS 50th Amsterdam, Netherlands Sep. 19-22, 1999, Piscataway, NJ, USA,IEEE, US, vol. 3, Sep. 19, 1999 (Sep. 19, 1999), pp. 1545-1549, XP010353233, DOI: 10.1109/VETECF.1999.801553, ISBN: 978-0-7803-5435-7.

(56) References Cited

OTHER PUBLICATIONS

Zhang H., "A new space-time-frequency MIMO-OFDM scheme with cyclic delay diversity", Frontiers of Mobile and Wireless Communication, 2004. Proceedings of the IEEE 6th Circuits and Systems Symposium on vol. 2, Jun. 2, 2004, pp. 647 to 650.

* cited by examiner

METHOD AND APPARATUS FOR ANTENNA DIVERSITY IN MULTI-INPUT MULTI-OUTPUT COMMUNICATION SYSTEMS

This application is a Continuation of U.S. application Ser. No. 11/261,823, entitled, "Method and Apparatus for Providing Antenna Diversity in a Wireless Communication System," filed Oct. 27, 2005 which claims priority to provisional U.S. Application Ser. No. 60/710,408, entitled, "Method and Apparatus for Antenna Diversity in Multi-input Multi-output Communication Systems," filed Aug. 22, 2005, and provisional U.S. Application Ser. No. 60/711,144 entitled, "Method and Apparatus for Antenna Diversity in Multi-input Multi-output Communication Systems," filed Aug. 24, 2005, both assigned to the assignee hereof and incorporated herein by reference.

BACKGROUND

I. Field

The present disclosure relates generally to communication, and more specifically to transmission schemes for wireless communication.

II. Background

In a wireless communication system, a transmitter (e.g., a base station or a terminal) may utilize multiple (T) transmit antennas for data transmission to a receiver equipped with one or more (R) receive antennas. The multiple transmit antennas may be used to increase system throughput by transmitting different data from these antennas and/or to improve reliability by transmitting data redundantly. For example, the transmitter may transmit a given symbol from all T transmit antennas, and the receiver may receive multiple versions of this symbol via the R receive antennas. These multiple versions of the transmitted symbol generally improve the receiver's ability to recover the symbol.

Transmission performance may be improved by exploiting the spatial dimension obtained with the multiple transmit antennas and, if present, the multiple receive antennas. A propagation path exists between each pair of transmit and receive antennas. T·R different propagation paths are formed between the T transmit antennas and the R receive antennas. These propagation paths may experience different channel conditions (e.g., different fading, multipath, and interference effects) and may achieve different signal-to-noise-and-interference ratios (SNRs). The channel responses for the T·R propagation paths may vary from path to path and may further vary across frequency for a dispersive wireless channel and/or over time for a time-variant wireless channel.

A major drawback to using multiple transmit antennas for data transmission is that the channel response between each pair of transmit and receive antennas (or each propagation path) typically needs to be estimated in order to properly receive the data transmission. Estimation of the full channel response for all T·R transmit and receive antenna pairs may be undesirable for several reasons. First, a large amount of link resources may be consumed in order to transmit a pilot used for channel estimation, which in turn reduces the link resources available to transmit data. Second, channel estimation for all T·R transmit and receive antenna pairs increases processing overhead at the receiver.

There is therefore a need in the art for transmission schemes that can ameliorate the need to estimate the full channel response for all transmit and receive antenna pairs.

SUMMARY

Transmission schemes that can flexibly achieve the desired spatial multiplexing order, spatial diversity order, and channel estimation overhead order are described herein. The spatial multiplexing order determines the number of symbols to send simultaneously on one subcarrier in one symbol period, the spatial diversity order determines the amount of spatial diversity observed by the transmitted symbols, and the channel estimation overhead order determines the amount of pilot overhead.

In an embodiment, for a data transmission from a transmitter to a receiver, the subcarriers assigned to the receiver and the spatial multiplexing order (M) for the receiver are determined, where $M \geq 1$. For each assigned subcarrier, M virtual antennas are selected from among V virtual antennas formed with V columns of an orthonormal matrix, where $V \geq M$. V may be selected to achieve the desired spatial diversity order and channel estimation overhead order. The M virtual antennas for each assigned subcarrier may be selected in various manners, as described below. Output symbols for the receiver are mapped to the M virtual antennas selected for each assigned subcarrier by applying the orthonormal matrix. Pilot symbols are also mapped to the V virtual antennas. The mapped output symbols and pilot symbols (or transmit symbols) are provided for transmission from T physical transmit antennas, where $T \geq V$. Transmission symbols (e.g., OFDM symbols or SC-FDMA symbols) are generated for each transmit antenna based on the transmit symbols for that transmit antenna. Different cyclic delays may be applied to the transmission symbols for the T transmit antennas.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
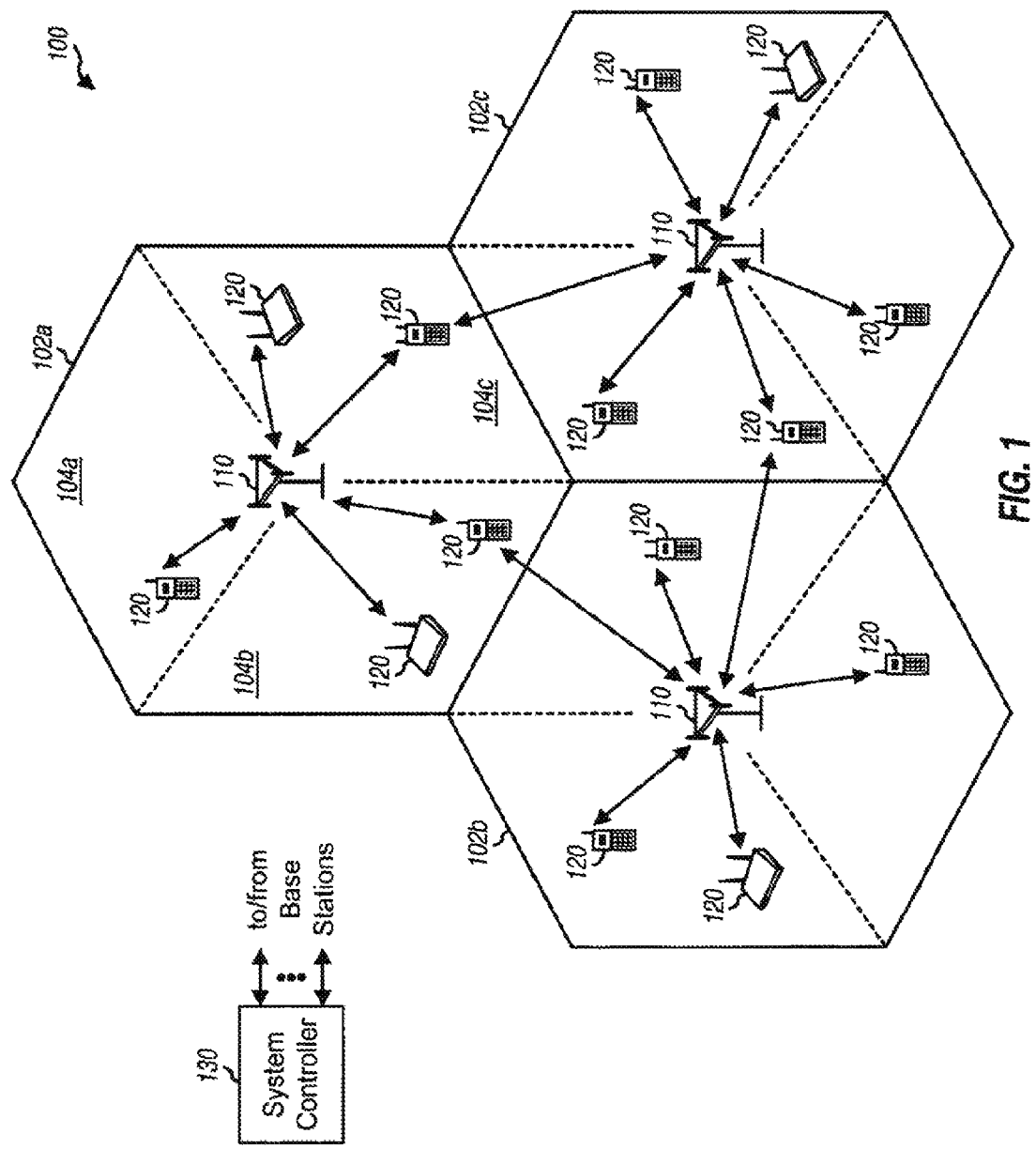
FIG. 1 shows a wireless communication system.

FIG. 1 shows a wireless communication system 100 with multiple base stations 110 and multiple terminals 120. A base station is a station that communicates with the terminals. A base station may also be called, and may contain some or all of the functionality of, an access point, a Node B, and/or some other network entity. Each base station 110 provides communication coverage for a particular geographic area 102. The term "cell" can refer to a base station and/or its coverage area depending on the context in which the term is used. To improve system capacity, a base station coverage area may be partitioned into multiple smaller areas, e.g., three smaller areas 104a, 104b, and 104c. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The transmission techniques described herein may be used for a system with sectorized cells as well as a system with un-sectorized cells. For example, the techniques may be used for the system described in the aforementioned U.S. patent application Ser. No. 11/175,675. For simplicity, in the following description, the term "base station" is used generically for a BTS that serves a sector as weir as a base station that serves a cell.

Terminals 120 are typically dispersed throughout the system, and each terminal may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. Each terminal may communicate with zero, one, or multiple base stations on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for these base stations. For a distributed architecture, the base stations may communicate with one another as needed.

The transmission techniques described herein may be used for various wireless communication systems such as an orthogonal frequency division multiple access (OFDMA) system, a single-carrier frequency division multiple access (SC-FDMA) system, a frequency division multiple access (FDMA) system, a code division multiple access (CDMA) system, a time division, multiple access (TDMA) system, a spatial division multiple access (SDMA) system, and so on. An QFDMA system utilizes orthogonal frequency division multiplexing (OFDM), which is a multi-carrier modulation technique that partitions the overall system bandwidth into multiple (K) orthogonal sub carriers. These subcarriers may also be called tones, bins, and so on. With OFDM, each subcarrier is associated with a respective subcarrier that may be modulated with data. An SC-FDMA system may utilize interleaved FDMA (IFDMA) to transmit on subcarriers that are distributed across the system bandwidth, localized FDMA (LFDMA) to transmit on a block of adjacent subcarriers, or enhanced FDMA (EFDMA) to transmit on multiple blocks of adjacent subcarriers. In general, modulation symbols are sent in the frequency domain with OFDM and in the time domain with SC-FDMA.

An OFDM symbol may be generated for one transmit antenna in one symbol period as follows. N modulation symbols are mapped to N subcarriers used for transmission (or N assigned subcarriers) and zero symbols with signal value of zero are mapped to the remaining K-N subcarriers. A K-point inverse fast Fourier transform (IFFT) or inverse discrete Fourier transform (IDFT) is performed on the K modulation symbols and zero symbols to obtain a sequence of K time-domain samples. The last Q samples of the sequence are copied to the start of the sequence to form an OFDM symbol that contains K+Q samples. The Q copied samples are often called a cyclic prefix or a guard interval, and Q is the cyclic prefix length. The cyclic prefix is used to combat intersymbol interference (ISI) caused by frequency selective fading, which is a frequency response that varies across the system bandwidth.

An SC-FDMA symbol may be generated for one transmit antenna in one symbol period as follows. N modulation symbols to be sent on N assigned subcarriers are transformed to the frequency domain with an N-point fast Fourier transform (FFT) or discrete Fourier transform (DFT) to obtain N frequency-domain symbols. These N frequency-domain symbols are mapped to the N assigned subcarriers, and zero symbols are mapped to the remaining K-N subcarriers. A K-point IFFT or IDFT is then performed on the K frequency-domain symbols and zero symbols to obtain a sequence of K time-domain samples. The last Q samples of the sequence are copied to the start of the sequence to form an SC-FDMA symbol that contains K+Q samples.

A transmission symbol may be an OFDM symbol or an SC-FDMA symbol. The K+Q samples of a transmission symbol are transmitted in K+Q sample/chip periods. A symbol period is the duration of one transmission symbol and is equal to K+Q sample/chip periods.

The transmission techniques described herein may be used for the downlink as well as the uplink. For clarity, much of the following description is for downlink transmission from a base station (a transmitter) to one or more terminals (receivers). For each subcarrier, the base station may transmit to one terminal without SDMA or to multiple terminals with SDMA.

Figure 2A:
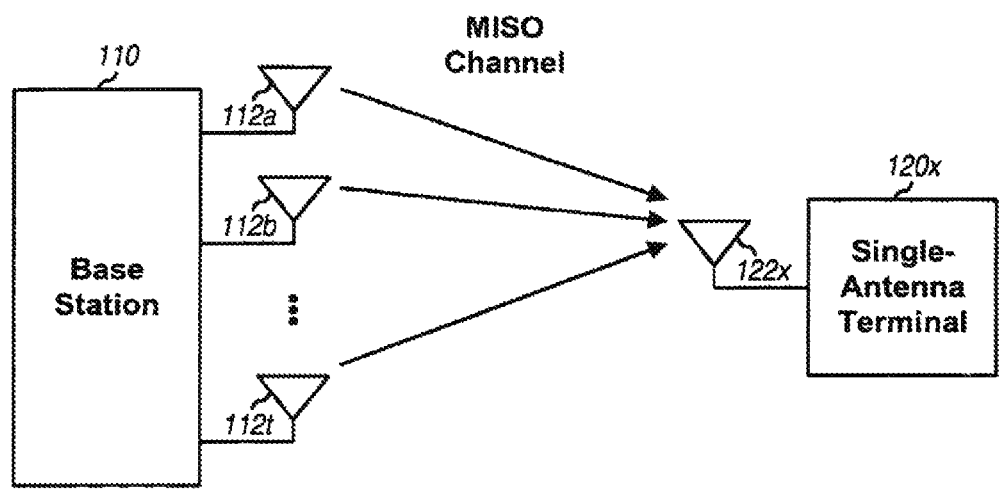
FIGS. 2A and 2B show MISO and MIMO channels, respectively.

FIG. 2A shows a multiple-input single-output (MISO) channel formed by multiple (T) transmit antennas 112a through 112t at base station 110 and a single receive antenna 122x at a terminal 120x. The MISO channel may be characterized by a 1× T channel response row vector $\underline{h}(k)$ for each subcarrier k, which may be given as:

$$\underline{h}(k)=[h_1(k)h_2(k)\ldots h_T(k)], \quad\quad \text{Eq (1)}$$

where $h_i(k)$, for $i=1,\ldots,T$, denotes the coupling or complex channel gain between transmit antenna i and the single receive antenna for subcarrier k.

Figure 2B:
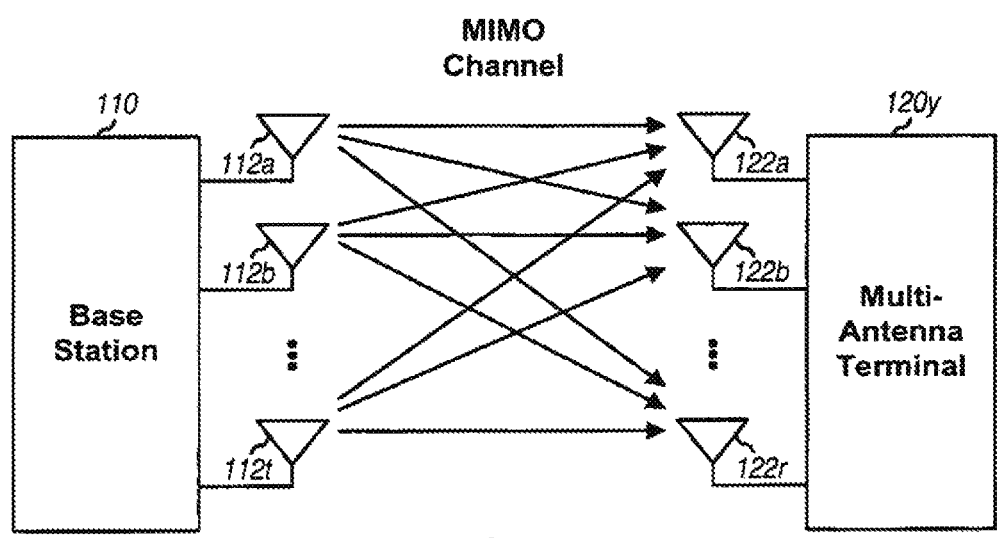

FIG. 2B shows a multiple-input multiple-output (MIMO) channel formed by the T transmit antennas 112a through 112t at base station 110 and multiple (R) receive antennas 122a through 122r at a terminal 120y. The MIMO channel may be characterized by an R×T channel response matrix $\underline{H}(k)$ for each subcarrier k, which may be given as:

$$\underline{H}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix} = [\underline{h}_1(k)\underline{h}_2(k)\ldots \underline{h}_T(k)], \quad \text{Eq (2)}$$

where $h_{j,i}(k)$, for j=1, ..., R and i=1, ..., T, denotes the complex channel gain between transmit antenna/and receive antenna j for subcarrier k; and $\underline{h}_i(k)$ is an R×1 channel response vector for transmit antenna i, which is the i-th column of $\underline{H}(k)$.

The transmitter may transmit one or more output symbols from the T transmit antennas on each subcarrier in each symbol period. Each output symbol may be a modulation symbol for OFDM, a frequency-domain symbol for SC-FDMA, or some other complex value. The data transmission may be quantified by the following metrics:

Spatial multiplexing order (M)—the number of output symbols transmitted via the T transmit antennas on one subcarrier in one symbol period;

Spatial diversity order (D)—the amount of spatial diversity observed by the transmitted output symbols; and Channel estimation overhead order (C)—the number of virtual antennas to be estimated by a receiver for each receive antenna.

In general, M≤min {T, R}, D≤T, and C≤T. The spatial diversity refers to transmit diversity resulting from the use of multiple transmit antennas and does not include receive diversity resulting from the use of multiple receive antennas.

If the transmitter transmits output symbols directly from the T transmit antennas, then a receiver typically needs to estimate the full channel response for all T transmit antennas in order to recover the data transmission. The channel estimation overhead order is then C=T. In certain scenarios, it may be desirable to transmit fewer than T output symbols simultaneously, e.g., if the channel conditions are poor. A subset of the T transmit antennas may be used to transmit fewer than T output symbols. However, this is undesirable since the transmit powers available for the unused transmit antennas are not judiciously employed for transmission.

The transmission schemes described herein allow for flexible selection of the three metrics M, D and C in order to achieve good performance for data transmission in different conditions. For example, a larger spatial multiplexing order M may be selected for good channel conditions with high SNRs, and a smaller spatial multiplexing order may be selected for poor channel conditions with low SNRs. A lower channel estimation overhead order C may be selected, e.g., in scenarios where low throughput due to low SNRs does not justify a large channel estimation overhead.

The transmission schemes described herein can utilize all T transmit antennas for transmission, regardless of the number of output symbols being sent and regardless of which subcarriers are used for transmission. This capability allows the transmitter to utilize all of the transmit power available for the T transmit antennas, e.g. by utilizing the power amplifiers coupled to each of the antennas, for transmission, which generally improves performance. Employing fewer than T transmit antennas for transmission typically results in less than all of the available transmit power being used for the transmission, which would impact performance.

The transmission schemes described herein can readily support MIMO, single-input multiple-output (SIMO), and single-input single-output (SISO) transmissions. A MIMO transmission is a transmission of multiple output symbols from multiple virtual antennas to multiple receive antennas on one subcarrier in one symbol period. A SIMO transmission is a transmission of a single output symbol from one virtual antenna to multiple receive antennas on one subcarrier in one symbol period. A SISO transmission is a transmission of a single output symbol from one virtual antenna to one receive antenna on one subcarrier in one symbol period. The transmitter may also send a combination of MIMO, SIMO and/or SISO transmissions to one or more receivers in one symbol period.

The transmitter may transmit M output symbols simultaneously from the T transmit antennas on one subcarrier in one symbol period using various transmission schemes. In an embodiment, the transmitter processes the output symbols for transmission, as follows:

$$\underline{x}(k) = \underline{U} \cdot \underline{P}(k) \cdot \underline{s}(k), \quad \text{Eq (3)}$$

where $\underline{s}(k)$ is an M×1 vector containing M output symbols to be sent on subcarrier k in one symbol period;

$\underline{P}(k)$ is a V×M permutation matrix for subcarrier k, $\underline{U} = [\underline{u}_1 \underline{u}_2 \ldots \underline{u}_V]$ is a T×V orthonormal matrix; and $\underline{x}(k)$ is a T×1 vector containing T transmit symbols to be sent from the T transmit antennas on subcarrier k in one symbol period.

V is the number of virtual antennas formed with the orthonormal matrix $\underline{U}$. In general, 1≤M≤V≤T. V may be a fixed value or a configurable value.

The orthonormal matrix $\underline{U}$ is characterized by the property $\underline{U}^H \cdot \underline{U} = \underline{I}$, where "$H$" denotes a conjugate transpose and I is the identity matrix. The V columns of $\underline{U}$ are orthogonal to one another, and each column has unit power. In an embodiment, $\underline{U}$ is defined such that the sum of the squared magnitude of the V entries in each row is equal to a constant value. This property results in equal transmit power being used for all T transmit antennas. $\underline{U}$ may also be a unitary matrix that is characterized by the property $\underline{U}^H \cdot \underline{U} = \underline{U} \cdot \underline{U}^H = \underline{I}$. Orthonormal and unitary matrices may be formed as described below. The V columns of $\underline{U}$ are used to form V virtual antennas that may be used to send up to V output symbols on one subcarrier in one symbol period. The virtual antennas may also be called effective antennas or by some other terminology.

In an embodiment, a single orthonormal matrix $\underline{U}$ is used for all K total subcarriers in all symbol periods, so that $\underline{U}$ is not a function of subcarrier index k or symbol index n. In another embodiment, different orthonormal matrices are used for different subcarrier sets that may be assigned to different receivers. In yet another embodiment, different orthonormal matrices are used for different subcarriers. In yet another embodiment, different orthonormal matrices are used for different time intervals, where each time interval may span one or multiple symbol periods. In yet another embodiment, one or more orthonormal matrices are selected for use from among multiple orthonormal matrices, as described below. In general, data and pilot may be transmitted using one or more orthonormal matrices such that a receiver is able to estimate the channel response based on the pilot and use the channel response estimate to recover the data sent to the receiver.

The permutation matrix $\underline{P}(k)$ selects which M virtual antennas to use for subcarrier k from among the V virtual antennas available for use, or which M of the V columns of $\underline{U}$. The permutation matrix $\underline{P}(k)$ may be defined in various manners, and different permutation matrices may be used for different subcarriers, as described below.

Figure 3:
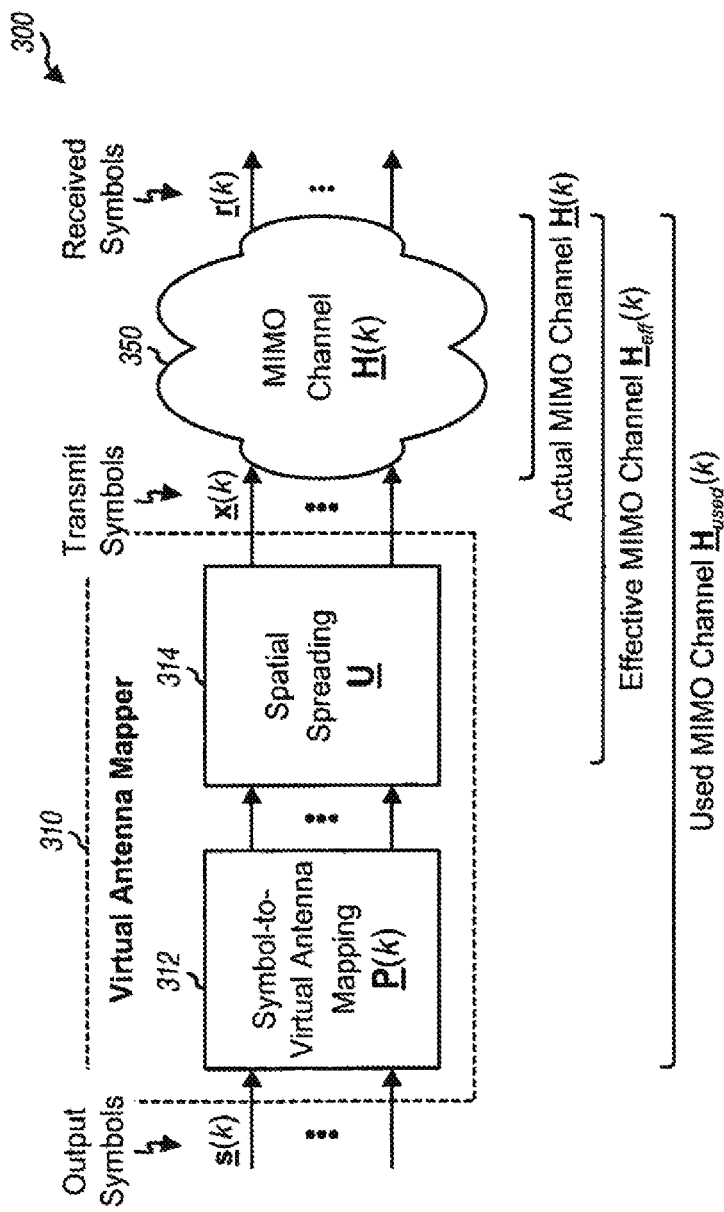
FIG. 3 shows a transmission scheme with virtual antennas.

FIG. 3 shows a model 300 for the transmission scheme given by equation (3). The transmitter receives the data vector $\underline{s}(k)$ for each subcarrier and symbol period used for transmission. A virtual antenna mapper 310 processes the data vector $\underline{s}(k)$ and generates the transmit vector $\underline{x}(k)$. Within virtual antenna mapper 310, a symbol-to-virtual antenna mapping unit 312 multiplies the data vector $\underline{s}(k)$ with the permutation matrix $\underline{P}(k)$ and generates a V×1 intermediate vector. A spatial spreading unit 314 multiplies the intermediate vector with the orthonormal matrix $\underline{U}$ and generates the transmit vector $\underline{x}(k)$. The transmit vector $\underline{x}(k)$ is transmitted from the T transmit antennas and via a MIMO channel 350 to R receive antennas at a receiver.

The received symbols at the receiver may be expressed as:

$$\begin{aligned}\underline{r}(k) &= \underline{H}(k) \cdot \underline{x}(k) + \underline{n}(k), \\ &= \underline{H}(k) \cdot \underline{U} \cdot \underline{P}(k) \cdot \underline{s}(k) + \underline{n}(k), \\ &= \underline{H}_{\mathit{eff}}(k) \cdot \underline{P}(k) \cdot \underline{s}(k) + \underline{n}(k), \\ &= \underline{H}_{\mathit{used}}(k) \cdot \underline{s}(k) + \underline{n}(k),\end{aligned} \quad \text{Eq (4)}$$

where $\underline{r}(k)$ is an R×1 vector containing R received symbols from the R receive antennas on subcarrier k in one symbol period;

$\underline{H}_{\mathit{eff}}(k)$ is an R×V effective channel response matrix for subcarrier k;

$\underline{H}_{\mathit{used}}(k)$ is an R×M used channel response matrix for subcarrier k; and $\underline{n}(k)$ is an R×1 noise vector for subcarrier k.

The effective and used channel response matrices may be given as:

$$\begin{aligned}\underline{H}_{\mathit{eff}}(k) &= \underline{H}(k) \cdot \underline{U}, \\ &= [\underline{H}(k) \cdot \underline{u}_1 \; \underline{H}(k) \cdot \underline{u}_2 \; \ldots \; \underline{H}(k) \cdot \underline{u}_v], \text{ and}\end{aligned} \quad \text{Eq (5)}$$

$$\begin{aligned}\underline{H}_{\mathit{used}}(k) &= \underline{H}_{\mathit{eff}}(k) \cdot \underline{P}(k), \\ &= [\underline{H}(k) \cdot \underline{u}_{(1)} \; \underline{H}(k) \cdot \underline{u}_{(2)} \; \ldots \; \underline{H}(k) \cdot \underline{u}_{(M)}],\end{aligned} \quad \text{Eq (6)}$$

where $\{\underline{u}_{(1)} \; \underline{u}_{(2)} \; \ldots \; \underline{u}_{(M)}\} \subseteq \{\underline{u}_1 \; \underline{u}_2 \; \ldots \; \underline{u}_v\}$.

As shown in equation (3) and illustrated in FIG. 3, an effective MIMO channel with V virtual antennas is formed by the use of the orthonormal matrix $\underline{U}$. Data is sent on all or a subset of the V virtual antennas. A used MIMO channel is formed by the M virtual antennas used for transmission.

For the transmission scheme described above, an R×T MIMO system is effectively reduced to an R×V MIMO system. The transmitter appears as if it has V virtual antennas rather than T transmit antennas, where V≤T. This transmission scheme decreases the channel estimation overhead order to C=V. However, the spatial multiplexing order is limited to V, or M≤V, and the spatial diversity order is also limited to V, or D≤V.

The description above is for one subcarrier k. The transmitter may perform the same processing for each subcarrier used for transmission. The frequency diversity of each virtual antenna across subcarriers is the same as the frequency diversity of the physical transmit antennas. However, the spatial diversity is reduced from T to V.

In another embodiment, the transmitter processes the output symbols for transmission, as follows:

$$\underline{\tilde{x}}(k) = \underline{D}(k) \cdot \underline{U} \cdot \underline{P}(k) \cdot \underline{s}(k), \quad \text{Eq (7)}$$

where $\underline{D}(k)$ is a T×T diagonal matrix for subcarrier k. $\underline{D}(k)$ is used to achieve cyclic delay diversity, which improves the frequency selectivity of the virtual antennas and may improve spatial diversity order to somewhere between V and T. Cyclic delay diversity may be achieved in the time domain or the frequency domain.

Cyclic delay diversity may be achieved in the time domain by circularly shifting (or cyclically delaying) the sequence of K time-domain samples (obtained from the K-point IDFT or IFFT) for each transmit antenna i by a delay of $T_i$, for i=1, ..., T. For example, $T_i$ may be defined as $T_i = (i-1) \cdot J$, where J may be equal to one sample period, a fraction of a sample period, or more than one sample period. J may be selected such that the channel impulse response for each virtual antenna is expected to be shorter than the cyclic prefix length. A cyclic delay of X samples may be achieved by moving the last X samples in the sequence of K time-domain samples to the front of the sequence. The time-domain samples for the T transmits antenna are cyclically delayed by different amounts. A cyclic prefix may be appended after applying the cyclic delay in order to ensure orthogonality among the K total subcarriers.

Cyclic delay diversity may also be achieved in the frequency domain by applying a phase ramp (or a progressive phase shift) across the K total subcarriers for each transmit antenna. T different phase ramps are used for the T transmit antennas to achieve K different cyclic delays for these antennas. The diagonal matrix $\underline{D}(k)$ for each subcarrier k may be defined as follows:

$$\underline{D}(k) = \begin{bmatrix} 1 & 0 & \ldots & 0 \\ 0 & e^{j2\pi \cdot (k-1) \cdot J/T} & \ldots & 0 \\ \vdots & \vdots & \ddots & \vdots \\ 0 & 0 & \ldots & e^{j2\pi \cdot (k-1) \cdot (T-1) \cdot J/T} \end{bmatrix}, \quad \text{Eq (8)}$$

for $k = 1, \ldots, K$.

As indicated by equation (8), transmit antenna 1 has a phase slope of 0 across the K total subcarriers, transmit antenna 2 has a phase slope of $2\pi \cdot J/T$ across the K total subcarriers, and so on, and transmit antenna T has a phase slope of $2\pi \cdot (T-1) \cdot J/T$ across the K total subcarriers. The diagonal matrix $\underline{D}(k)$ and the orthonormal matrix $\underline{U}$ may also be combined to obtain a new orthonormal matrix $\underline{\tilde{U}}(k) = \underline{D}(A) \cdot \underline{U}$, where $\underline{\tilde{U}}(k)$ may be applied to the data vector $\underline{s}(k)$.

The received symbols with cyclic delay diversity may be expressed as:

$$\begin{aligned}\underline{\tilde{r}}(k) &= \underline{H}(k) \cdot \underline{\tilde{x}}(k) + \underline{n}(k), \\ &= \underline{H}(k) \cdot \underline{D}(k) \cdot \underline{U} \cdot \underline{P}(k) \cdot \underline{s}(k) + \underline{n}(k), \\ &= \underline{\tilde{H}}_{\mathit{eff}}(k) \cdot \underline{P}(k) \cdot \underline{s}(k) + \underline{n}(k), \\ &= \underline{\tilde{H}}_{\mathit{used}}(k) \cdot \underline{s}(k) + \underline{n}(k),\end{aligned} \quad \text{Eq (9)}$$

where $\underline{\tilde{r}}(k)$ is an R×1 received vector with cyclic delay diversity, $\underline{\tilde{H}}_{\mathit{eff}}(k)$ is an R×V effective channel response matrix with cyclic delay diversity; and $\underline{\tilde{H}}_{\mathit{used}}(k)$ is an R×M used channel response matrix with cyclic delay diversity.

The effective and used channel response matrices may be given as:

$$\begin{aligned}\underline{\tilde{H}}_{\mathit{eff}}(k) &= \underline{H}(k) \cdot \underline{D}(k) \cdot \underline{U}, \\ &= [\underline{H}(k) \cdot \underline{D}(k) \cdot \underline{u}_1 \; \underline{H}(k) \cdot \underline{D}(k) \cdot \underline{u}_2 \; \ldots \; \underline{H}(k) \cdot \underline{D}(k) \cdot \underline{u}_v],\end{aligned} \quad \text{Eq (10)}$$

and $$\begin{aligned}\underline{\tilde{H}}_{\mathit{used}}(k) &= \underline{\tilde{H}}_{\mathit{eff}}(k) \cdot \underline{P}(k), \\ &= [\underline{H}(k) \cdot \underline{D}(k) \cdot \underline{u}_1 \; \underline{H}(k) \cdot \underline{D}(k) \cdot \underline{u}_2 \; \ldots \; \underline{H}(k) \cdot \underline{D}(k) \cdot \underline{u}_{(M)}].\end{aligned} \quad \text{Eq (11)}$$

Figure 4:
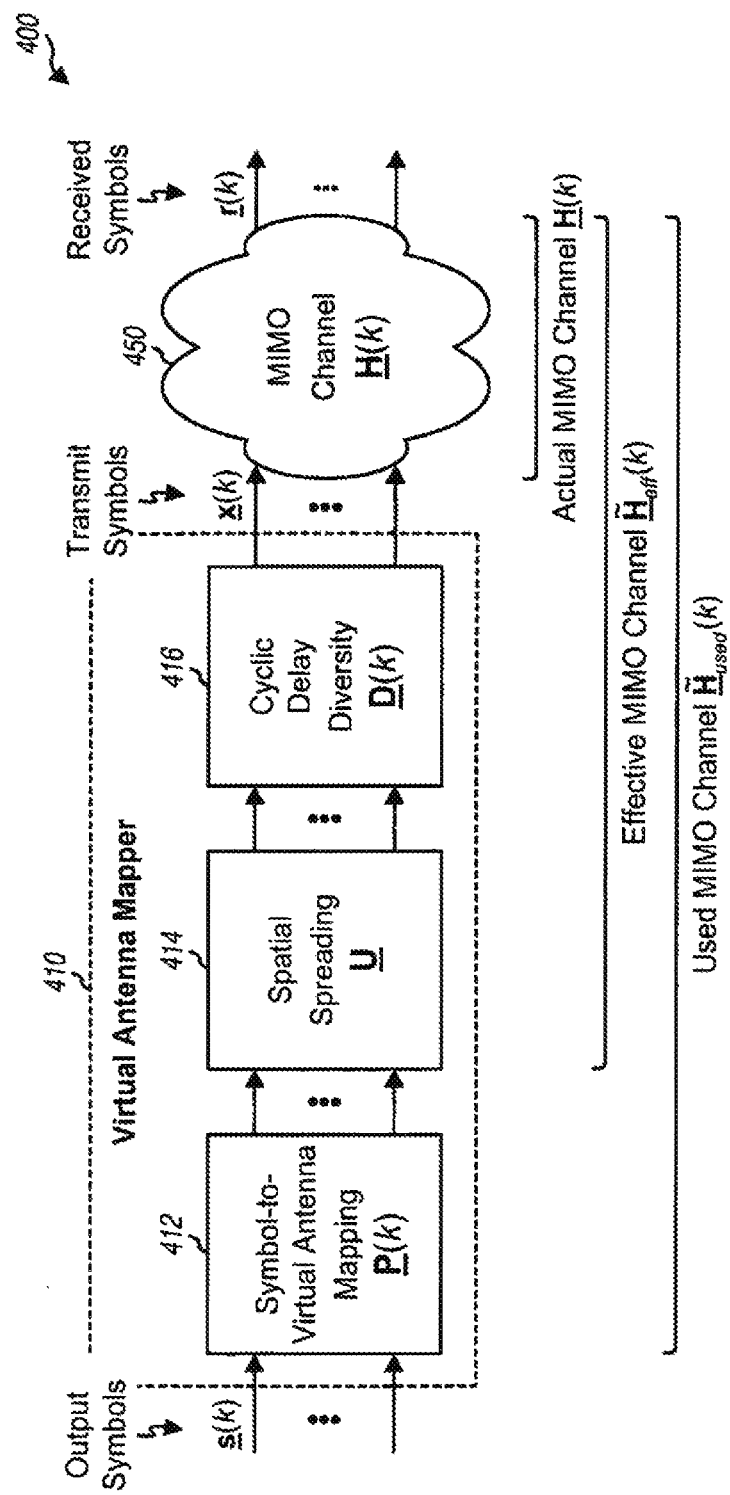
FIG. 4 shows a transmission scheme with virtual antennas and cyclic delay diversity.

FIG. 4 shows a model 400 for the transmission scheme given by equation (7). Within a virtual antenna mapper 410, a symbol-to-virtual antenna mapping unit 412 multiplies the data vector $\underline{s}(k)$ with the permutation matrix $\underline{P}(k)$ and generates a V×1 vector. A spatial spreading unit 414 multiplies the V×1 vector with the orthonormal matrix $\underline{U}$ and generates a T×1 vector. A cyclic delay diversity unit 416 multiplies the T×1 vector with the diagonal matrix $\underline{D}(k)$ and generates the T×1 transmit vector $\underline{x}(k)$. The transmit vector $\underline{x}(k)$ is transmitted from the T transmit antennas and via a MIMO channel 450 to R receive antennas at a receiver.

As shown in equation (7) and illustrated in FIG. 4, an effective MIMO channel $\underline{\tilde{H}}_{eff}(k)$ with V virtual antennas is formed by the use of the orthonormal matrix $\underline{U}$ and cyclic delay diversity. A used MIMO channel $\underline{\tilde{H}}_{used}(k)$ is formed by the M virtual antennas used for transmission.

Equations (3) and (7) assume that equal transmit power is used for the M output symbols being sent simultaneously on one subcarrier in one symbol period. In general, the transmit power available for each transmit antenna may be uniformly or non-uniformly distributed across the subcarriers used for transmission. The transmit powers available for the T transmit antennas for each subcarrier may be uniformly or non-uniformly distributed to the M output symbols being sent on that subcarrier. Different transmit powers may be used for the M output, symbols by scaling the data vector $\underline{s}(k)$ with a diagonal gain matrix $\underline{G}$ as follows: $\underline{x}(k)=\underline{U}\cdot\underline{P}(k)\cdot\underline{G}\cdot\underline{s}(k)$ or $\underline{\tilde{x}}(k)=\underline{D}(k)\cdot\underline{U}\cdot\underline{P}(k)\cdot\underline{G}\cdot\underline{s}(k)$, where $\mathrm{diag}\{\underline{G}\}=\{g_1, g_2 \ldots g_M\}$ and $g_i$ is the gain for output symbol $s_i$.

Various types of matrices may be used to form the orthonormal matrix $\underline{U}$. For example, $\underline{U}$ may be formed based on a Fourier matrix, a Walsh matrix, or some other matrix. A T×T Fourier matrix $\underline{F}_{T\times T}$ has element $f_{n,m}$ in the n-th row of the m-th column, which may be expressed as:

$$f_{n,m} = e^{-j2\pi\frac{(n-1)(m-1)}{T}}, \quad \text{Eq (12)}$$

for $n = 1, \ldots, T$ and $m = 1, \ldots, T$.

Fourier matrices of any square dimension (e.g., 2, 3, 4, 5, 6, and so on) may be formed. A 2×2 Walsh matrix $\underline{W}_{2\times 2}$ and larger size Walsh matrix $\underline{W}_{2N\times 2N}$ may be expressed as:

$$\underline{W}_{2\times 2} = \begin{bmatrix} 1 & 1 \\ 1 & -1 \end{bmatrix} \text{ and} \quad \text{Eq (13)}$$

$$\underline{W}_{2N\times 2N} = \begin{bmatrix} \underline{W}_{N\times N} & \underline{W}_{N\times N} \\ \underline{W}_{N\times N} & -\underline{W}_{N\times N} \end{bmatrix}.$$

In an embodiment, the orthonormal matrix $\underline{U}$ is equal to a matrix containing V columns of a T×T Fourier matrix or a T×T Walsh matrix. In another embodiment, $\underline{U}$ is formed as follows:

$$\underline{U}=\underline{\Lambda}\cdot\underline{F}, \quad \text{Eq (14)}$$

where $\underline{F}$ is a T×V matrix containing the first V columns: of the T×T Fourier matrix; and $\underline{\Lambda}$ is a T×T diagonal matrix containing T scaling values for the T rows of $\underline{F}$.

For example, the diagonal matrix $\underline{\Lambda}$ may be defined as $\underline{\Lambda}=\mathrm{diag}\{1 \; e^{j\theta_1} \ldots e^{j\theta_T}\}$, where $\theta_i$ for i–1, ..., T may be random phases. Equation (14) multiplies the tows of $\underline{F}$ with random phases, which changes the spatial directions depicted by the columns of $\underline{F}$. In yet another embodiment, $\underline{U}$ is an orthonormal matrix with pseudo-random elements, e.g., having unit magnitude and pseudo-random phases.

The transmitter may send a MIMO, SIMO or SISO transmission to a receiver on a set of subcarriers, which are called the assigned subcarriers. The K total subcarriers may be partitioned into multiple non-overlapping subcarrier sets. In this case, the transmitter may transmit to multiple receivers simultaneously on multiple subcarrier sets. The transmitter may send the same or different types of transmission to these multiple receivers. For example, the transmitter may send a MIMO transmission on a first subcarrier set to a first receiver, a SIMO transmission on a second subcarrier set to a second receiver, a SISO transmission on a third subcarrier set to a third receiver, and so on.

A SIMO or SISO transmission may be sent from a single virtual antenna formed with a single column of the orthonormal matrix $\underline{U}$. In this case, M=V=1, and the effective MIMO channel becomes an R×1 SISO or SIMO channel having a channel response vector of $\underline{h}_{eff}(k)=\underline{H}(k)\cdot\underline{u}_1$ or $\underline{h}_{eff}(k)=\underline{H}(k)\cdot\underline{D}(k)\cdot\underline{u}_1$. The data vector $\underline{s}(k)$ becomes a 1×1 vector containing a single output symbol, the permutation matrix $\underline{P}(k)$ becomes a 1×1 matrix containing a single '1', and the orthonormal matrix $\underline{U}$ becomes a T×1 matrix containing a single column.

A MIMO transmission may be sent from multiple virtual antennas formed with multiple columns of the orthonormal matrix $\underline{U}$. If the number of output symbols is less than the number of virtual antennas (or M<S), then M virtual antennas may be selected for use in various manners.

Figure 5:
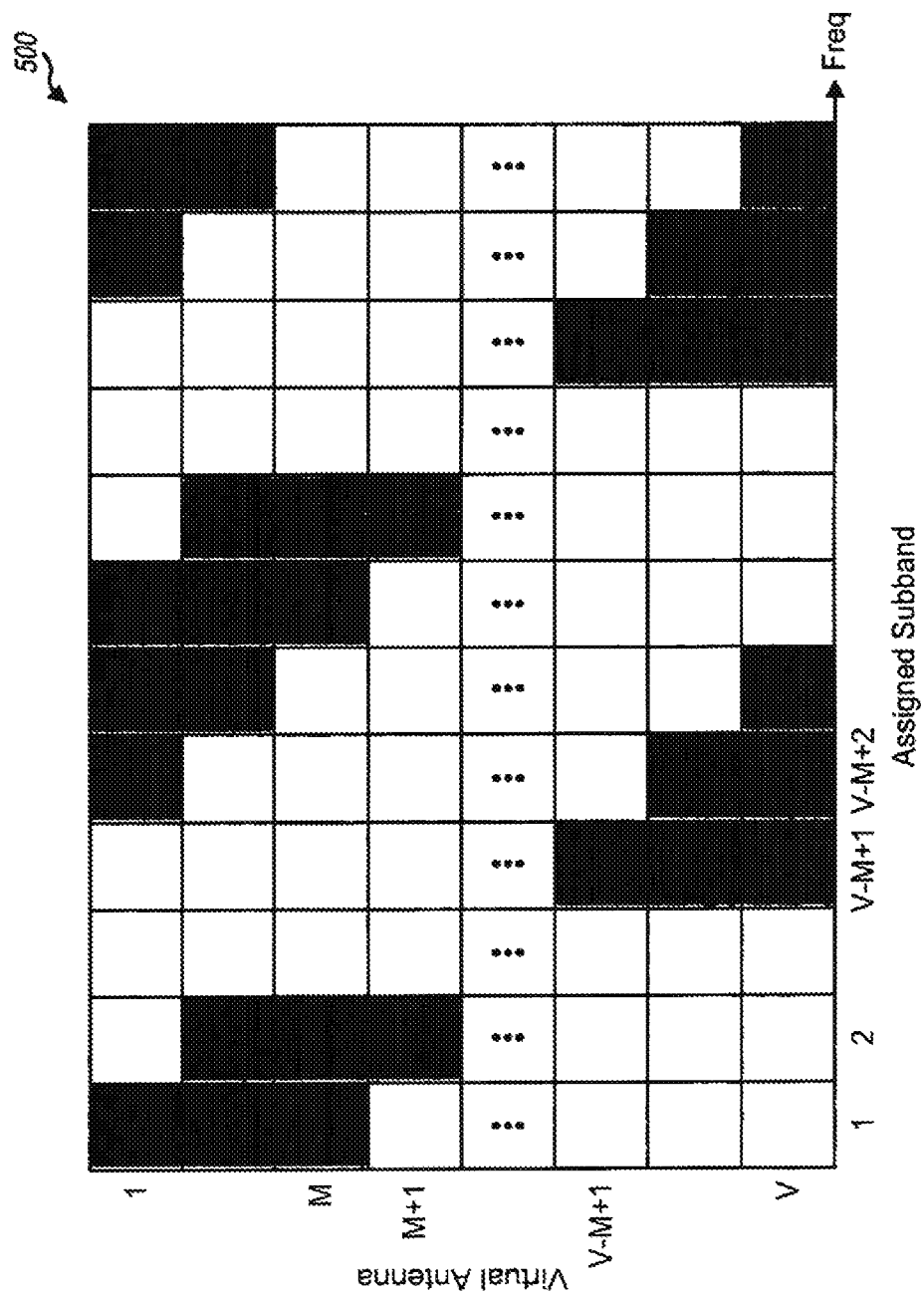
FIG. 5 shows a MIMO transmission by cycling through the virtual antennas.

FIG. 5 shows an embodiment for transmitting output symbols cyclically from the V virtual antennas. For this embodiment, the first M output symbols are sent from virtual antennas 1 through M on the first assigned subcarrier, the next M output symbols are sent from virtual antennas 2 through M+1 on the next assigned subcarrier, and so on. The assigned subcarriers may be given indices of k=1, 2, .... For the embodiment shown in FIG. 5, the M virtual antennas used for subcarrier k+1 are offset by one from the M virtual antennas used for subcarrier k. The selected virtual antennas wrap around to virtual antenna 1 upon reaching the last virtual antenna. Hence, virtual antennas ((k−1) mod V)+1 through ((k+M−2) mod V)+1 are used for assigned subcarrier k, where "mod S" denotes a modulo-S operation and the "−1" and "+1" are due to the index for the assigned subcarriers and the index for the virtual antennas starting with 1 instead of 0. The M columns of the permutation matrix $\underline{P}(k)$ for each assigned subcarrier k are the ((k−1, k, k+1, k+M−2) mod V)+1 columns of a V×V identify matrix: For example, if M-2 and V=3, then the permutation matrices may be defined as:

$$\underline{P}(1) = \begin{bmatrix} 1 & 0 \\ 0 & 1 \\ 0 & 0 \end{bmatrix}, \underline{P}(2) = \begin{bmatrix} 0 & 0 \\ 1 & 0 \\ 0 & 1 \end{bmatrix}, \quad \text{Eq (15)}$$

$$\underline{P}(3) = \begin{bmatrix} 0 & 1 \\ 0 & 0 \\ 1 & 0 \end{bmatrix}, \underline{P}(4) = \begin{bmatrix} 1 & 0 \\ 0 & 1 \\ 0 & 0 \end{bmatrix}, \text{and so on.}$$

In another embodiment, the first M output symbols are sent from virtual antennas 1 through M on the first assigned subcarrier, the next M output symbols are sent from virtual antennas M+1 through ((2M−1)mod V)+1 on the next assigned subcarrier, and so on. For this embodiment, the M virtual antennas used for subcarrier k+1 start after the last virtual antenna used for subcarrier k. In yet another embodiment, the M virtual antennas for each subcarrier are selected in a pseudo-random manner, e.g., based on a pseudo-random number (PN) generator or sequence that is also known to the receiver.

In yet another embodiment, the virtual antennas are selected based on feedback from a receiver. For example, the feedback may indicate the specific virtual antennas to use for all assigned subcarriers, the specific virtual antennas to use for each assigned subcarrier, and so on. In yet another embodiment, the transmitter may select the virtual antennas based on a pilot or some other transmission received from the receiver. For example, the transmitter may estimate the uplink channel response based on the received pilot, estimate the downlink channel response based on the uplink channel response estimate, and select the virtual antennas based on the downlink channel response estimate. The downlink and uplink channel responses may be similar, e.g., in a time division duplexed (TDD) system in which downlink and uplink transmissions are sent on the same frequency channel but indifferent time intervals.

In general, the virtual antennas may be selected (1) by the transmitter in a deterministic manner (e.g., cyclically) or a pseudo-random manner without feedback from the receiver, (2) by the transmitter based on feedback from receiver, or (3) by the receiver and sent to the transmitter.

The orthonormal matrix $\underline{U}$ may be fixed, and the V virtual antennas formed with $\underline{U}$ may be selected for use as described above. In another embodiment, one or more orthonormal matrices are selected for use from among a set of orthonormal matrices available for use. The set of orthonormal matrices forms a codebook, and one or more entries of the codebook may be used for transmission. The orthonormal matrices in the set are different (and may be pseudo-random) with respect to each other. For example, the orthonormal matrices may be defined to provide good performance for afferent channel conditions, e.g., low and high SNR conditions, low and high mobility, and so on. One orthonormal matrix may be selected for all assigned subcarriers, for each assigned subcarrier, and so on. The matrix selection may be made (1) by the transmitter with or without feedback from a receiver or (2) by the receiver and sent back to the transmitter. The matrix selection may be made based on various factors such as, e.g., the channel conditions, mobility, uplink resources, and so on. In general, the particular entry or entries in the codebook to use for transmission may be selected either autonomously by the transmitter or based on feedback from the receiver.

The transmission schemes described herein has the following desirable features:

Flexibility to easily select the number of virtual antennas;
Flexibility to send any number of output symbols up to the number of available virtual antennas; and
Utilization of all T transmit antennas for transmission regardless of the number of output symbols being sent and the number of available virtual antennas.

The number of virtual antennas (V) may be selected to support the desired spatial multiplexing order (M), to achieve the desired spatial diversity order (D), and to obtain the desired channel estimation overhead order (C). The number of virtual antennas may be selected autonomously by the transmitter or based on a feedback from the receiver. The desired number of virtual antennas may readily be obtained by defining the orthonormal matrix $\underline{U}$ with the proper number of columns.

The spatial multiplexing order is limited by the number of transmit antennas and the number of receive antennas, or $M \leq \min\{T, R\}$. A higher spatial multiplexing order may be desirable in certain scenarios (e.g., high SNR conditions) and if supported by the receiver. A lower spatial multiplexing order (e.g., M=1) may be desirable in Other scenarios (e.g., low SNR conditions) or if a higher spatial multiplexing order is not supported by the receiver. The spatial multiplexing order may be dynamically selected based on the channel conditions and/or other factors. For example, the spatial multiplexing order may be set to one if the SNR is less than a first threshold, set to two if the SNR is between the first threshold and a second threshold, set to three if the SNR is between the second threshold and a third threshold, and so on. The number of virtual antennas is selected to be equal to or greater than the spatial multiplexing order, or $V \geq M$.

In general, a higher spatial diversity order is desirable in order to improve performance, and a lower channel estimation overhead order is desirable in order to reduce the amount of link resources used to transmit a pilot for channel estimation. The channel estimation overhead order is closely related to the spatial diversity order, and both are determined by the number of virtual antennas. Hence, the number of virtual antennas may be dynamically selected based on the desired spatial diversity order, the desired channel estimation overhead order, the channel conditions, and/or other factors.

The number of virtual antennas may be selected in various manners. In an embodiment, the number of virtual antennas is set equal to the spatial multiplexing order, or V=M. In another embodiment, the number of virtual antennas is set to a largest possible value such that the link resources used for pilot transmission is maintained within a predetermined percentage of the total link resources. In yet another embodiment, the number of virtual antennas is set based on the channel conditions. For example, one virtual antenna may be defined if the SNR is less than a first value, two virtual antennas may be defined if the SNR is between the first value and a second value, and so on.

The transmission schemes described herein may be used with various subcarrier structures, some of which are described below. The following description assumes that the K total subcarriers are usable for transmission and are given indices of 1 through K.

Figure 6A:
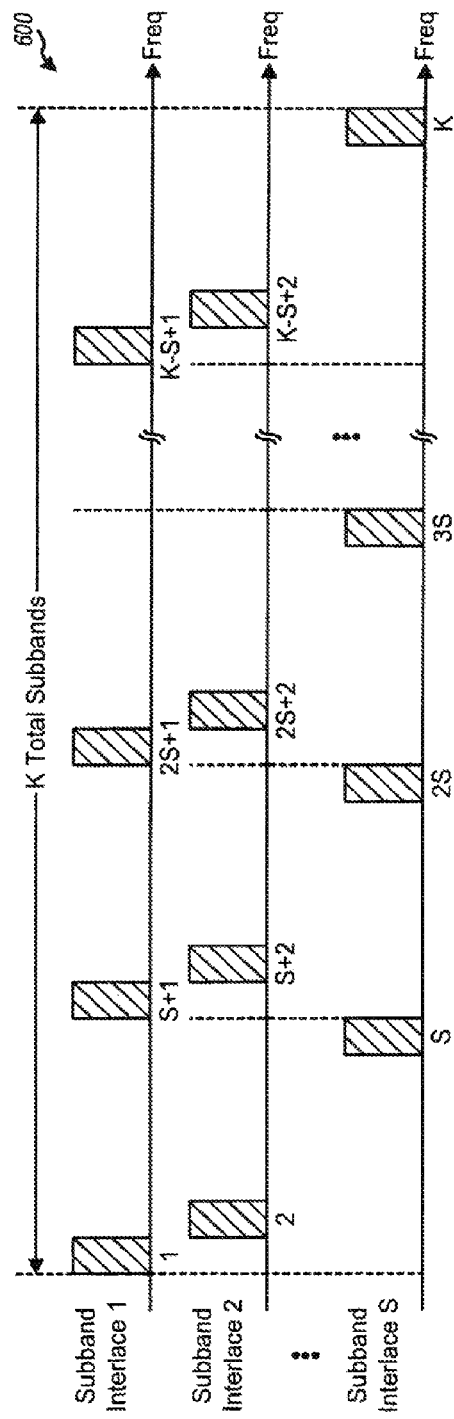
FIGS. 6A, 6B and 6C show three exemplary subcarrier structures.

FIG. 6A shows an interlace subcarrier structure 600. For this subcarrier structure, the K total subcarriers are arranged into S non-overlapping interlaces, each interlace contains N subcarriers that are uniformly distributed across the K total subcarriers, and consecutive subcarriers in each interlace are spaced apart by S subcarriers, where K=S·N. Interlace w contains subcarrier u as the first subcarrier, where $u \in \{1, \ldots, S\}$.

Figure 6B:
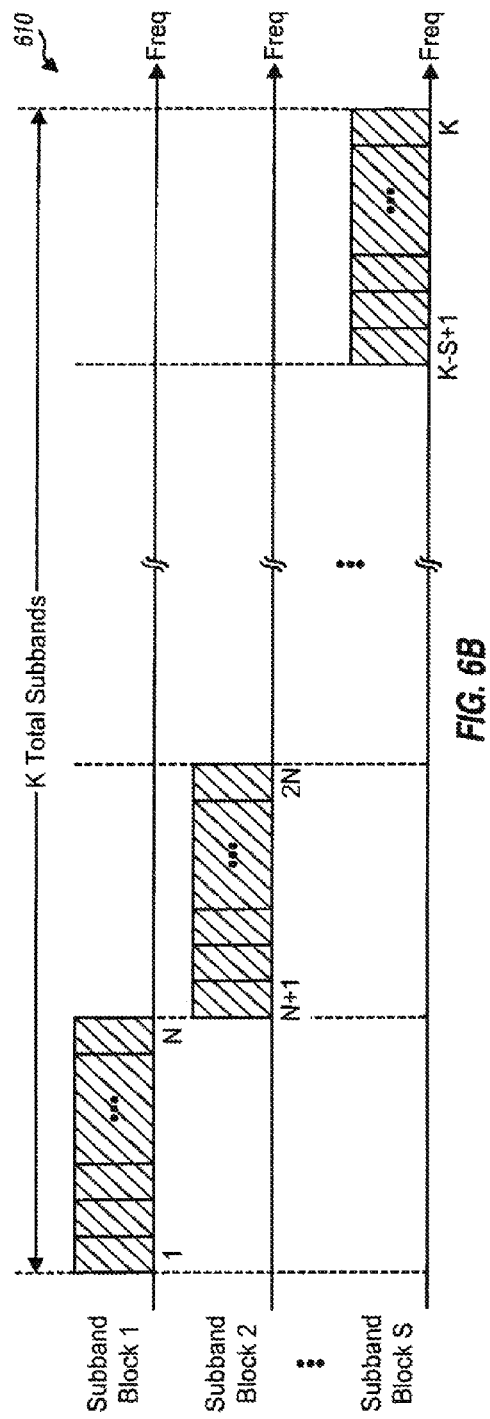

FIG. 6B shows a block subcarrier structure 610. For this subcarrier structure, the K total subcarriers are arranged into S non-overlapping blocks, with each block containing N adjacent subcarriers, where K=S·N. Block v contains subcarriers v·N+1 through (v+1)·N, where $v \in \{1, \ldots, S\}$.

Figure 6C:
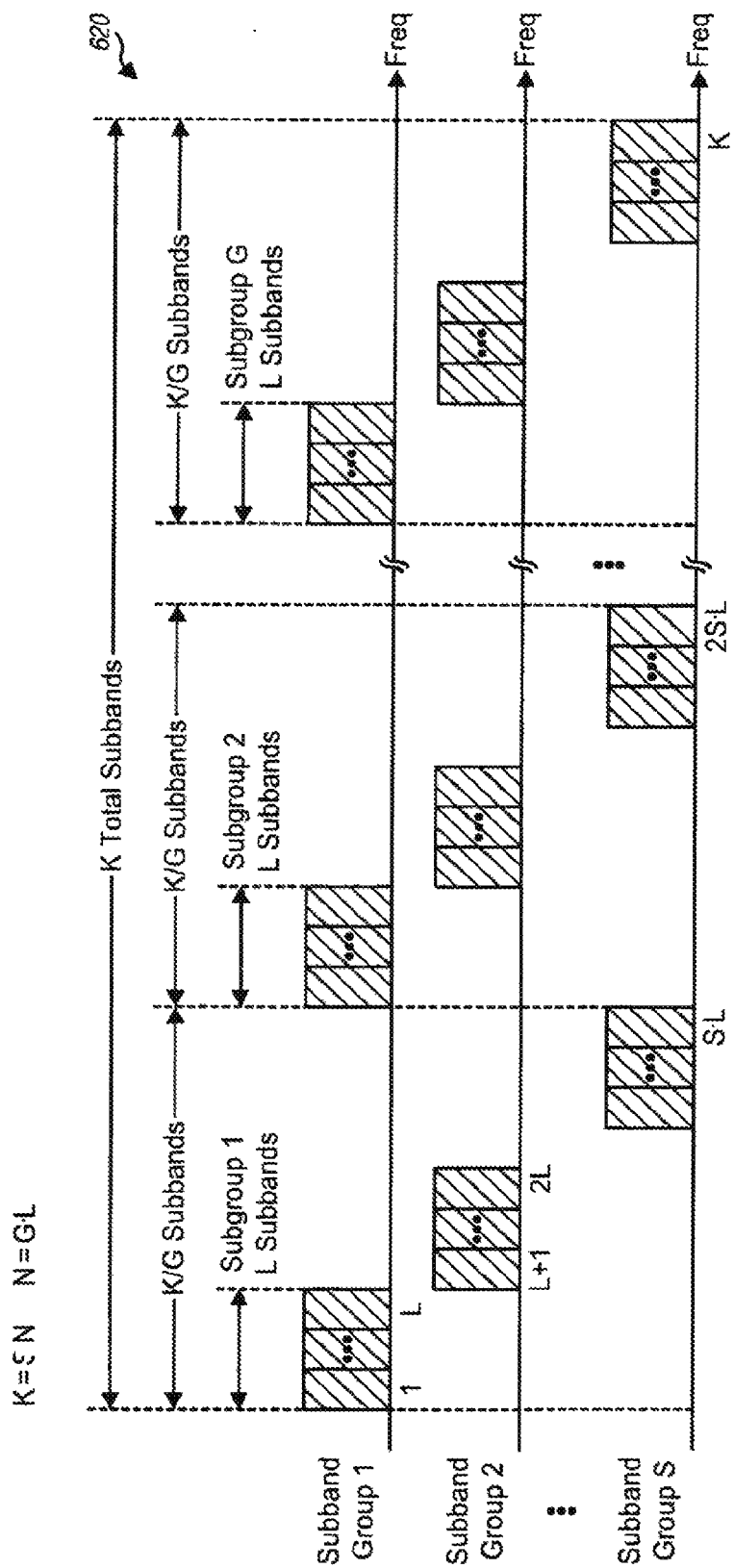

FIG. 6C shows a group subcarrier structure 620. For this subcarrier structure, the K total subcarriers are arranged into S non-overlapping groups, each group contains G subgroups that are distributed across the system bandwidth, and each subgroup contains L adjacent subcarriers, where K=S·N and N=G·L. The K total subcarriers may be partitioned into G frequency ranges, with each frequency range containing S·L consecutive subcarriers. Each frequency range is further partitioned into S subgroups, with each subgroup containing L consecutive subcarriers. For each frequency range, the first L subcarriers are allocated to group 1, the next L subcarriers are allocated to group 2, and so on, and the last L subcarriers are allocated to group S. Each group contains G subgroups of L consecutive subcarriers, or a total of N=G·L subcarriers.

In general, the transmission techniques described herein may be used for any subcarrier structure with any number of subcarrier sets. Each subcarrier set may include any number of subcarriers that may be arranged in any manner. For example, a subcarrier set may be equal to an interlace, a subcarrier block, a subcarrier group, and so on. For each subcarrier set, (1) the subcarriers in the set may be uniformly or non-uniformly distributed across the system bandwidth, (2) the subcarriers in the set may be adjacent to one another in one group, or (3) the subcarriers in the set may be distributed in multiple groups, where each group may be located anywhere within the system bandwidth and may contain one or multiple subcarriers.

For all of the subcarrier structures described above, different receivers may be assigned different subcarrier sets, and the transmitter may transmit data to each receiver on its assigned subcarrier set. The transmitter may use the same orthonormal matrix $\underline{U}$ for all receivers, a different orthonormal matrix for each receiver, a different orthonormal matrix for each subcarrier set, a different orthonormal matrix for each subcarrier, and so on.

The transmission techniques described herein may be used with or without frequency hopping. With frequency hopping, the data transmission hops from subcarrier to subcarrier in a pseudo-random or deterministic manner over time, which allows the data transmission to better withstand deleterious channel conditions such as narrowband interference, jamming, fading, and so on. Frequency hopping can provide frequency diversity and interference randomization. A receiver may be assigned a traffic channel that is associated with a hop pattern that indicates which subcarrier set(s), if any, to use in each time slot A hop pattern is also called a frequency hopping pattern or sequence. A time slot is the amount of time spent on a given subcarrier set and is also called a hop period. The hop pattern may select different subcarrier sets in different time slots in a pseudo-random or deterministic manner.

Figure 7:
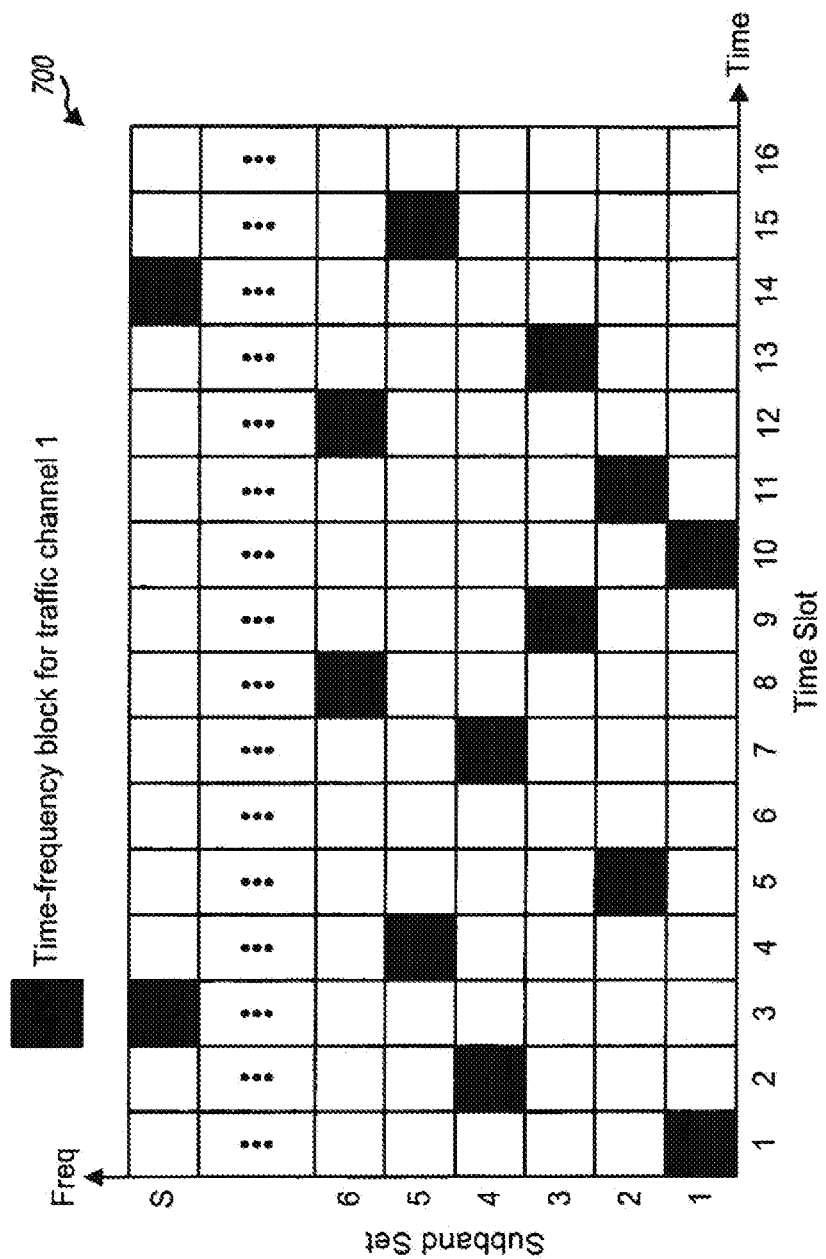
FIG. 7 shows an exemplary frequency hopping scheme.

FIG. 7 shows an exemplary frequency hopping scheme 700. In FIG. 7, traffic channel 1 is mapped to a specific sequence of time-frequency blocks. Each time-frequency block is a specific subcarrier set in a specific time slot. In the example shown in FIG. 7, traffic channel 1 is mapped to subcarrier set 1 in time slot 1, subcarrier set 4 in time slot 2, and so on. Traffic channels 2 through S may be mapped to vertically and circularly shifted versions of the time-frequency block sequence for traffic channel 1. For example, traffic channel 2 may be mapped to subcarrier set 2 in time slot 1, subcarrier set 5 in time slot 2, and so on.

Frequency hopping may be used with any of the subcarrier structures shown in FIGS. 6A through 6C. For example, a symbol rate hopping scheme may be defined in which each time-frequency block is a specific interlace in one symbol period. For this hopping scheme, the assigned subcarriers span across the entire system bandwidth and change from symbol period to symbol period. As another example, a block hopping scheme may be defined in which each time-frequency block is a specific subcarrier block in a time slot of multiple symbol periods. For this hopping scheme, the assigned subcarriers are contiguous and fixed for an entire time slot but changes from time slot to time slot. For the block hopping scheme, the spatial multiplexing order may be set equal to the number of virtual antennas, so that constant interference may be observed on any given time-frequency block in any sector for a system with synchronous sectors. Other hopping scheme may also be defined.

Pilot may be transmitted in various manners with the subcarrier structures described above. Some exemplary pilot schemes for symbol rate hopping and block hopping are described below.

Figure 8:
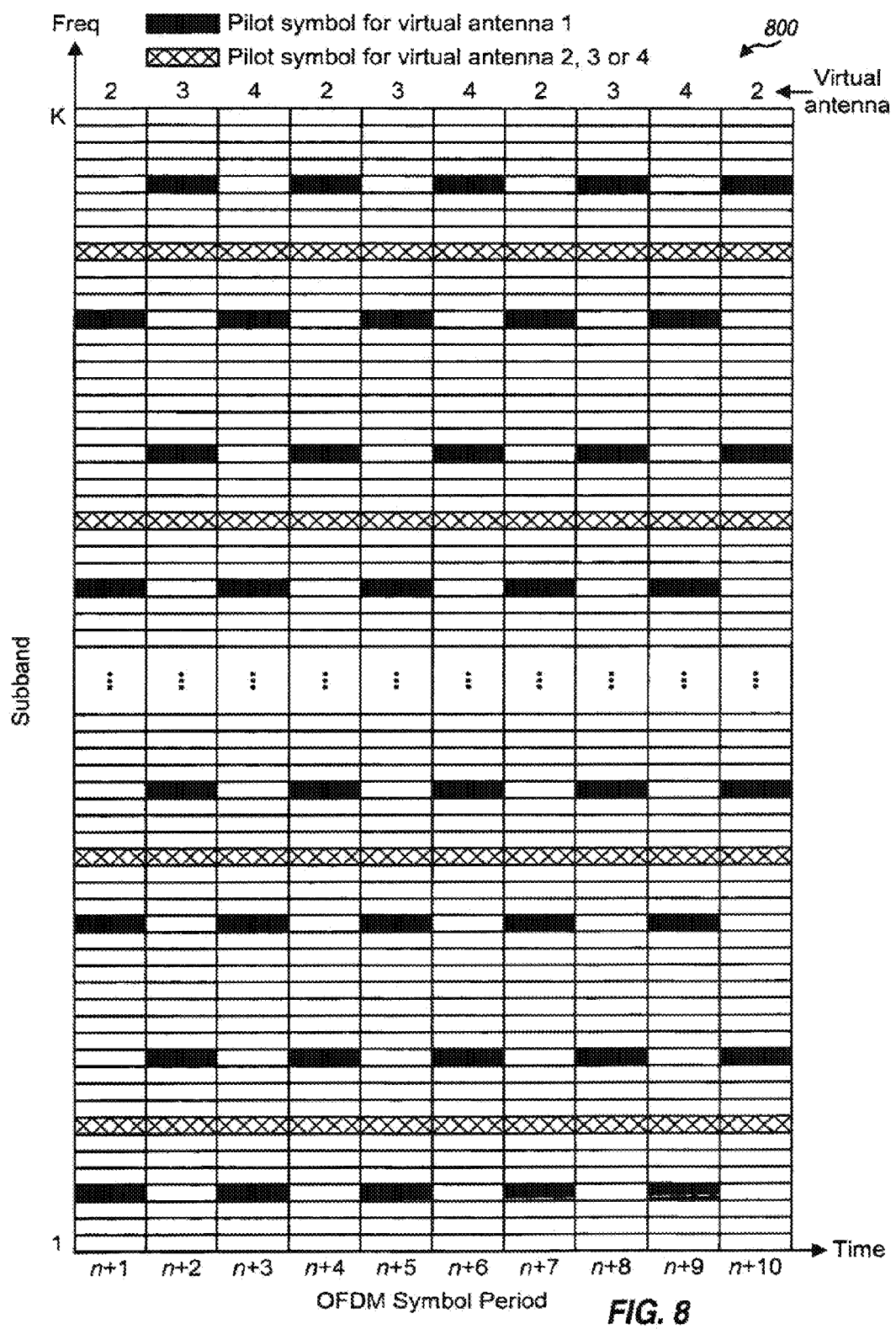
FIG. 8 shows an exemplary pilot scheme for symbol rate hopping.

FIG. 8 shows an exemplary pilot scheme 800 for symbol rate hopping. For pilot scheme 800, the transmitter transmits a common pilot on one interlace from virtual antenna 1 in each symbol period. The transmitter may transmit the common pilot on different interlaces in different symbol periods, as shown in FIG. 8. Such a staggered pilot allows a receiver to sample the frequency spectrum on more subcarriers and to derive a longer channel impulse response estimate. The transmitter may also transmit an auxiliary pilot on one or more interlaces from the remaining virtual antennas to allow MIMO receivers to estimate the channel response for all virtual antennas used for transmission. For the embodiment shown in FIG. 8, the transmitter transmits the auxiliary pilot on one interlace in each symbol period and cycles through virtual antennas 2 through V in V−1 different symbol periods. For the case with V=4 as shown in FIG. 8, the transmitter transmits the auxiliary pilot from virtual antenna 2 in symbol period n+1, then from virtual antenna 3 in symbol period n+2, then from virtual antenna 4 in symbol period n+3, then from virtual antenna 2 in symbol period n+4, and so on.

The transmitter may transmit the common and auxiliary pilots in other manners. In another embodiment, the auxiliary pilot is staggered and sent on different sets of subcarriers. In yet another embodiment, the common pilot is sent on one or more subcarrier sets that are pseudo-random (or have random offsets) with respect to the one or more subcarrier sets used for the auxiliary pilot.

The transmitter may transmit the common pilot for MIMO, SIMO and SISO receivers and may transmit the auxiliary pilot only when MIMO receivers are present The MIMO, SIMO and SISO receivers may use the common pilot to derive a channel estimate for the K total subcarriers of virtual antenna 1. A MIMO receiver may use the auxiliary pilot to derive channel estimates for virtual antennas 2 through V.

Figure 9A:
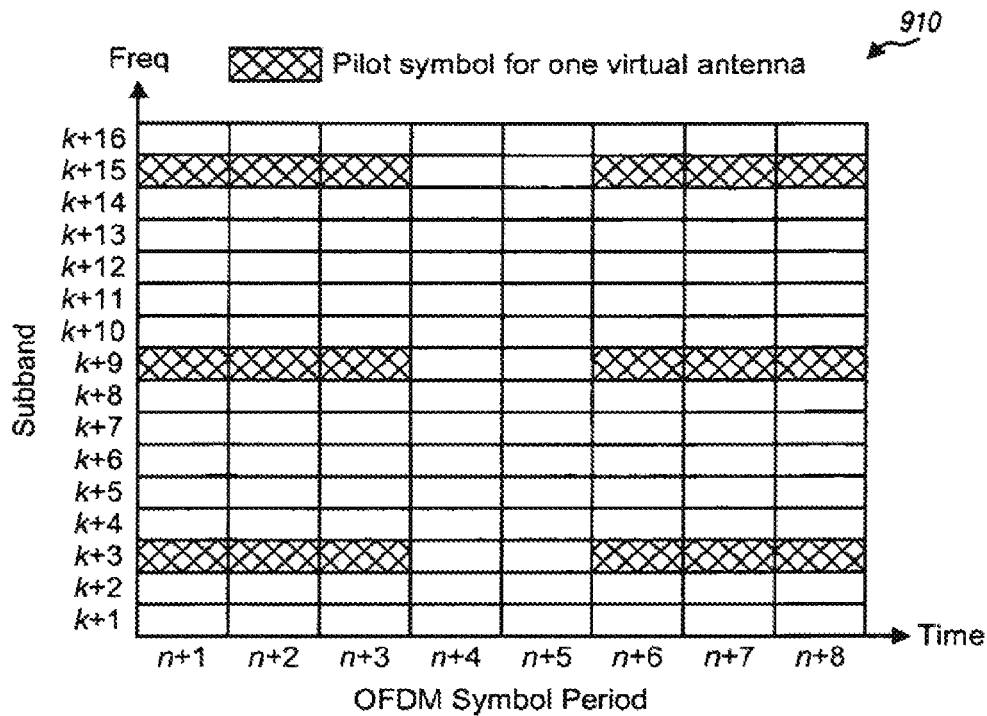
FIG. 9A through 9D show four exemplary pilot schemes for block hopping.

FIG. 9A shows an exemplary pilot scheme 910 for block hopping. For the embodiment shown in FIG. 9A, a time-frequency block is composed of 16 adjacent subcarriers k+1 through k+16 and further spans 8 symbol periods n+1 through n+8. For pilot scheme 910, the transmitter transmits a dedicated pilot on subcarriers k+3, k+9 and k+15 in each of symbol periods n+1 through n+3 and n+6 through n+8, or six strips of three pilot symbols. Each pilot symbol may be sent from any virtual antenna. For example, if V=3, then the transmitter may transmit the pilot from virtual antenna 1 in symbol periods n+1 and n+6, from virtual antenna 2 in symbol periods n+2 and n+7, and from virtual antenna 3 in symbol periods n+3 and n+8.

Figure 9B:
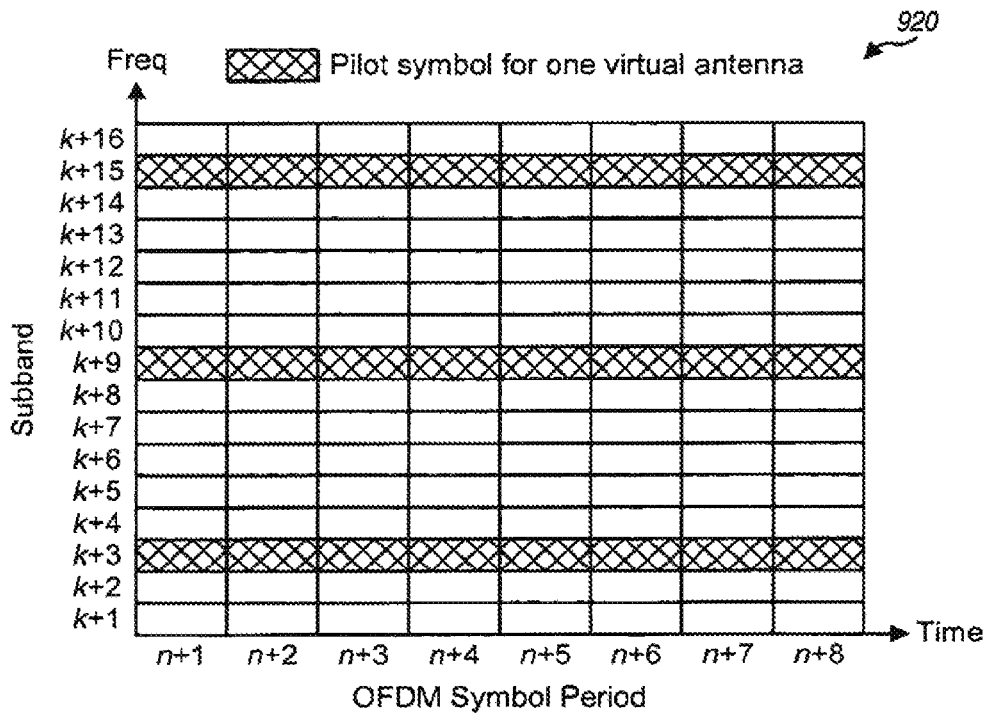

FIG. 9B shows an exemplary pilot scheme 920 for block hopping. For pilot scheme 920, the transmitter transmits a dedicated pilot on subcarriers k+3, k+9 and k+15 in each of symbol periods n+1 through n+8, or three strips of eight pilot symbols. Each pilot symbol may be sent from any virtual antenna. For example, if V=4, then the transmitter may transmit the pilot from virtual antenna 1 in symbol periods n+1 and n+5, from virtual antenna 2 in symbol periods n+2 and n+6, from virtual antenna 3 in symbol periods n+3 and n+7, and from virtual antenna 4 in symbol periods n+4 and n+8.

Figure 9C:
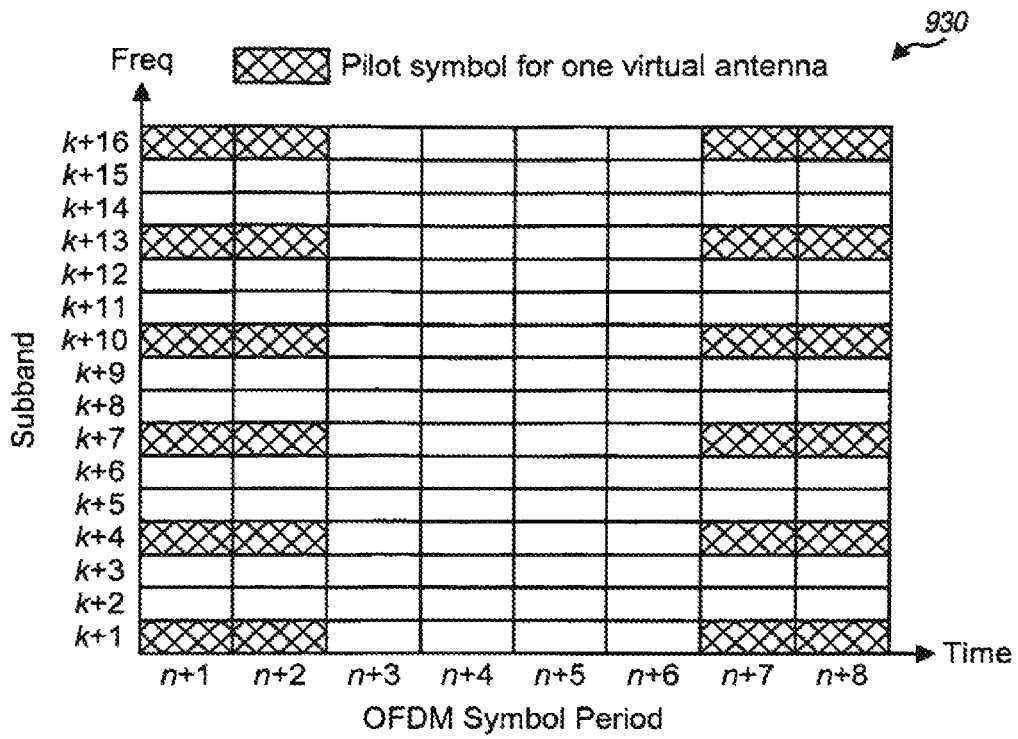

FIG. 9C shows an exemplary pilot scheme 930 for block hopping. For pilot scheme 930, the transmitter transmits a dedicated pilot on subcarriers k+1, k+4, k+7, k+10, k+13 and k+16 in each of symbol periods n+1, n+2, n+7 and n+8. Each pilot symbol may be sent from any virtual antenna. For example, the transmitter may transmit the pilot from virtual antenna 1 in symbol period n+1, from virtual antenna 2 in symbol period n+2, from virtual antenna 1 or 3 in symbol period n+7, and from virtual antenna 2 or 4 in symbol period n+8.

Figure 9D:
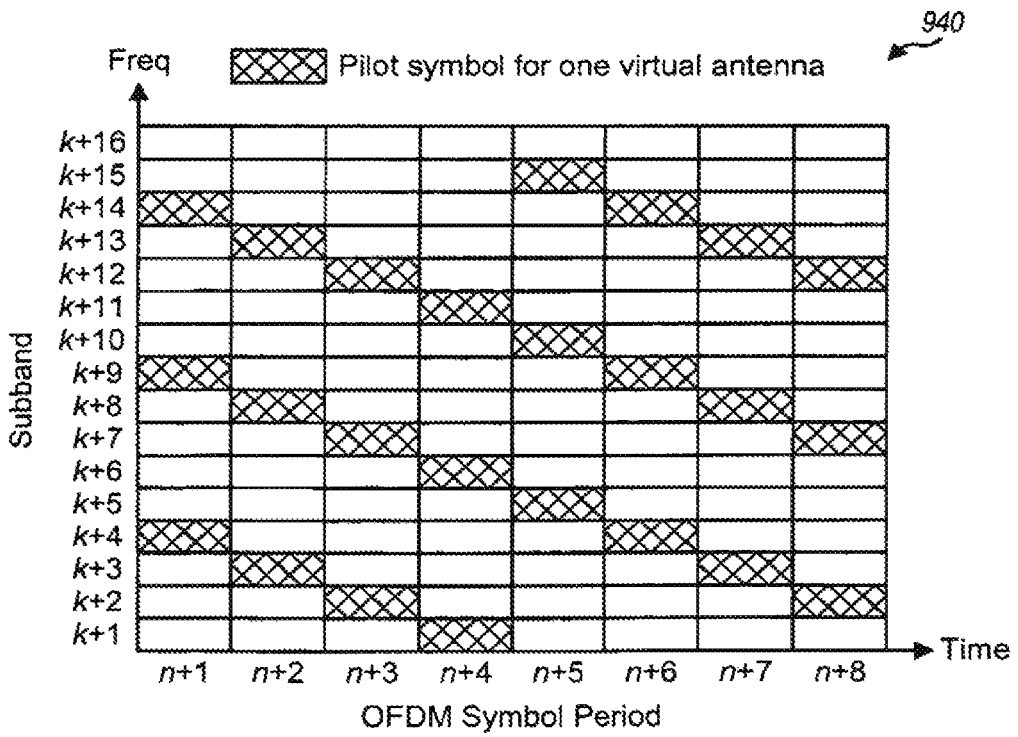

FIG. 9D shows an exemplary pilot scheme 940 for block hopping. For pilot scheme 940, the transmitter transmits a staggered pilot on three subcarriers in each symbol period and on different pilot subcarriers in different symbol periods. Each pilot symbol may be sent from any virtual antenna For example, the transmitter may transmit the pilot from a different virtual antenna in each symbol period and may cycle through the V virtual antennas in V symbol periods.

In general, for the block hopping scheme, the transmitter may transmit a pilot in each time-frequency block such that a receiver is able to derive a channel estimate for each virtual antenna used for transmission. FIGS. 9A through 9D show four exemplary pilot patterns that may be used. Other pilot patterns may also be defined and used for pilot transmission.

For both symbol rate hopping and block hopping, the transmitter may transmit the pilot from any number of virtual antennas, may use any number of pilot subcarriers for each virtual antenna, and may use any amount of transmit power for each virtual antenna. If the pilot is sent from multiple virtual antennas, then the transmitter may use the same or different numbers of subcarriers for these virtual antennas and may transmit the pilot at the same or different power levels for the virtual antennas. The transmitter may or may not stagger the pilot for each virtual antenna. The transmitter may transmit the pilot on more subcarriers to allow a receiver to obtain more "look" of the wireless channel in the frequency domain and to derive a longer channel impulse response estimate. The transmitter may transmit the pilot on all pilot subcarriers from one virtual antenna in each symbol period, as described above. Alternatively, the transmitter may transmit the pilot from multiple virtual antennas on multiple subsets of subcarriers in a given symbol period.

In an embodiment, the transmitter transmits the pilot from the virtual antennas, as described above for FIGS. 8 through 9D. In another embodiment, the transmitter transmits the pilot from the physical antennas, without applying the orthonormal matrix $\underline{U}$ or the permutation matrix $\underline{P}(k)$. For this embodiment, a receiver may estimate the actual channel response based on the pilot and may then derive an effective channel response estimate based on the actual channel response estimate and the orthonormal and permutation matrices.

Figure 10:
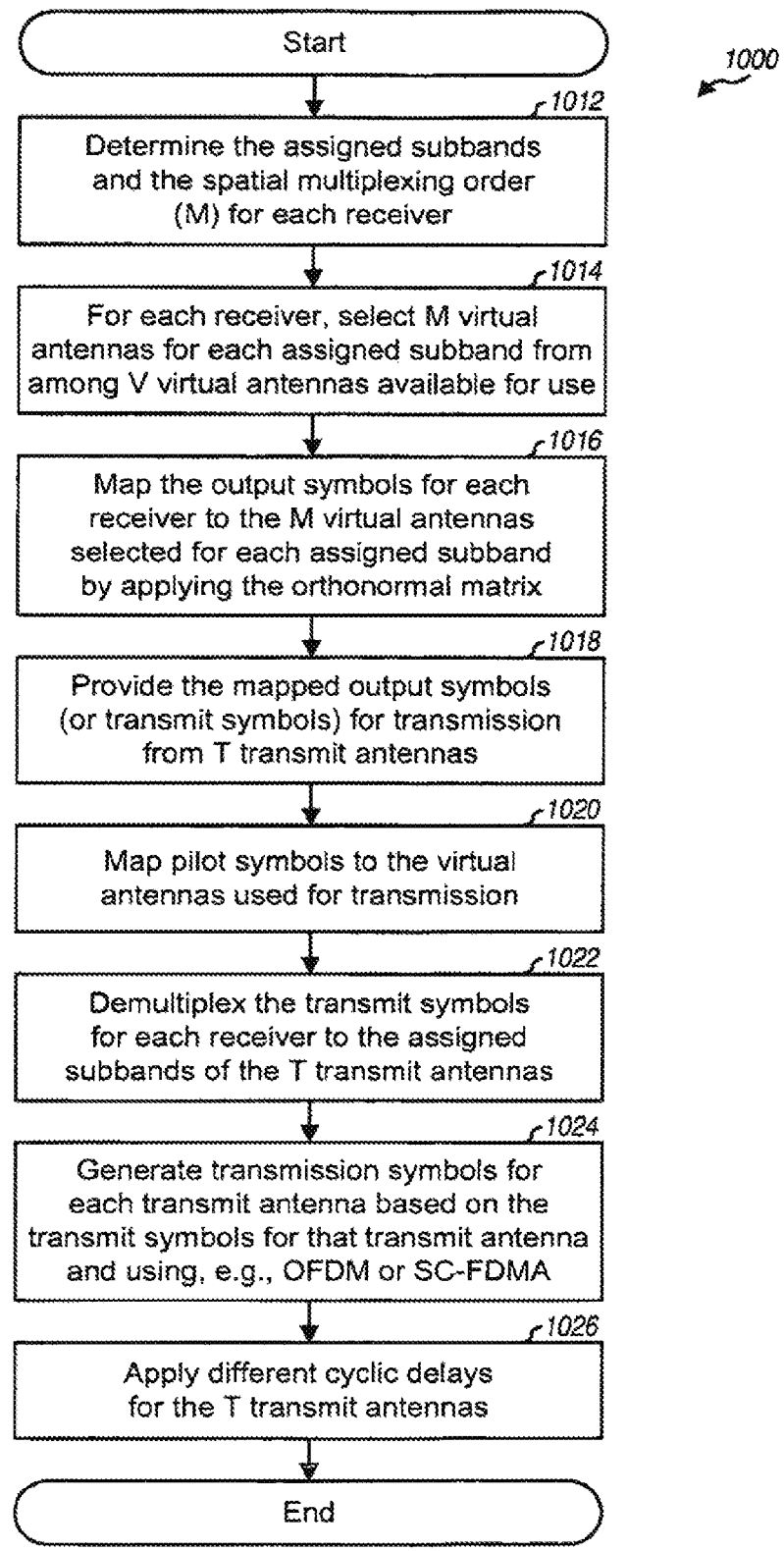
FIG. 10 shows a process for transmitting data and pilot to one or more receivers.

FIG. 10 shows a process 1000 for transmitting data and pilot to one or more receivers. The processing for each receiver may be performed as follows. The set of subcarriers assigned to the receiver and the spatial multiplexing order (M) for the receiver are determined, where M≥1 (block 1012). For each assigned subcarrier, M virtual antennas are selected for use from among V virtual antennas formed with V columns of the orthonormal matrix $\underline{U}$, where V≥M (block 1014). The M virtual antennas for each assigned subcarrier may be selected in various manners, as described above. The output symbols for the receiver are mapped to the M virtual antennas selected for each assigned subcarrier by applying the orthonormal matrix (block 1016). The mapped output symbols (or transmit symbols) are provided for transmission from T transmit antennas, where T≥V (block 1018).

Pilot symbols are also mapped to the virtual antennas used for transmission (block 1020). For example, pilot symbols for a common pilot may be mapped to the first virtual antenna on a first set of pilot subcarriers, and pilot symbols for an auxiliary pilot may be mapped to the remaining virtual antennas on a second set of pilot subcarriers.

If there are multiple receivers, then the same or different spatial multiplexing orders may be used for these receivers. Furthermore, data may be sent simultaneously on different subcarrier sets to multiple receivers. For example, data may be sent from one virtual antenna on a first subcarrier set to a SIMO or SISO receiver, from multiple virtual antennas on a second subcarrier set to a MIMO receiver, and so on. In any case, the transmit symbols for all receivers are demultiplexed to the T transmit antennas (block 1022). For each transmit antenna, the transmit symbols for each receiver are mapped to the subcarriers assigned to that receiver (also block 1022). Transmission symbols are then generated for each transmit antenna based on the transmit symbols for that transmit antenna and using, e.g., OFDM or SC-FDMA (block 1024). Different cyclic delays may be applied for the T transmit antennas, e.g., by circularly delaying the transmission symbols for each transmit antenna by a different amount (block 1026).

For block 1016 in FIG. 10, the output symbol(s) for each subcarrier assigned to each receiver are mapped to the T transmit antennas based on M mapping patterns selected from among V mapping patterns available for use. Each mapping pattern indicates a specific mapping of an output symbol to the T transmit antennas. The V mapping patterns may be formed by V columns of an orthonormal matrix or in other manners. Different mapping patterns may be selected for different subcarriers in a given symbol period and/or different symbol periods, e.g., based on a predetermined pattern. The predetermined pattern may be defined by a permutation matrix or in some other manner. The predetermined pattern may cycle through the V available mapping patterns in different subcarriers and/or symbol periods.

Figure 11:
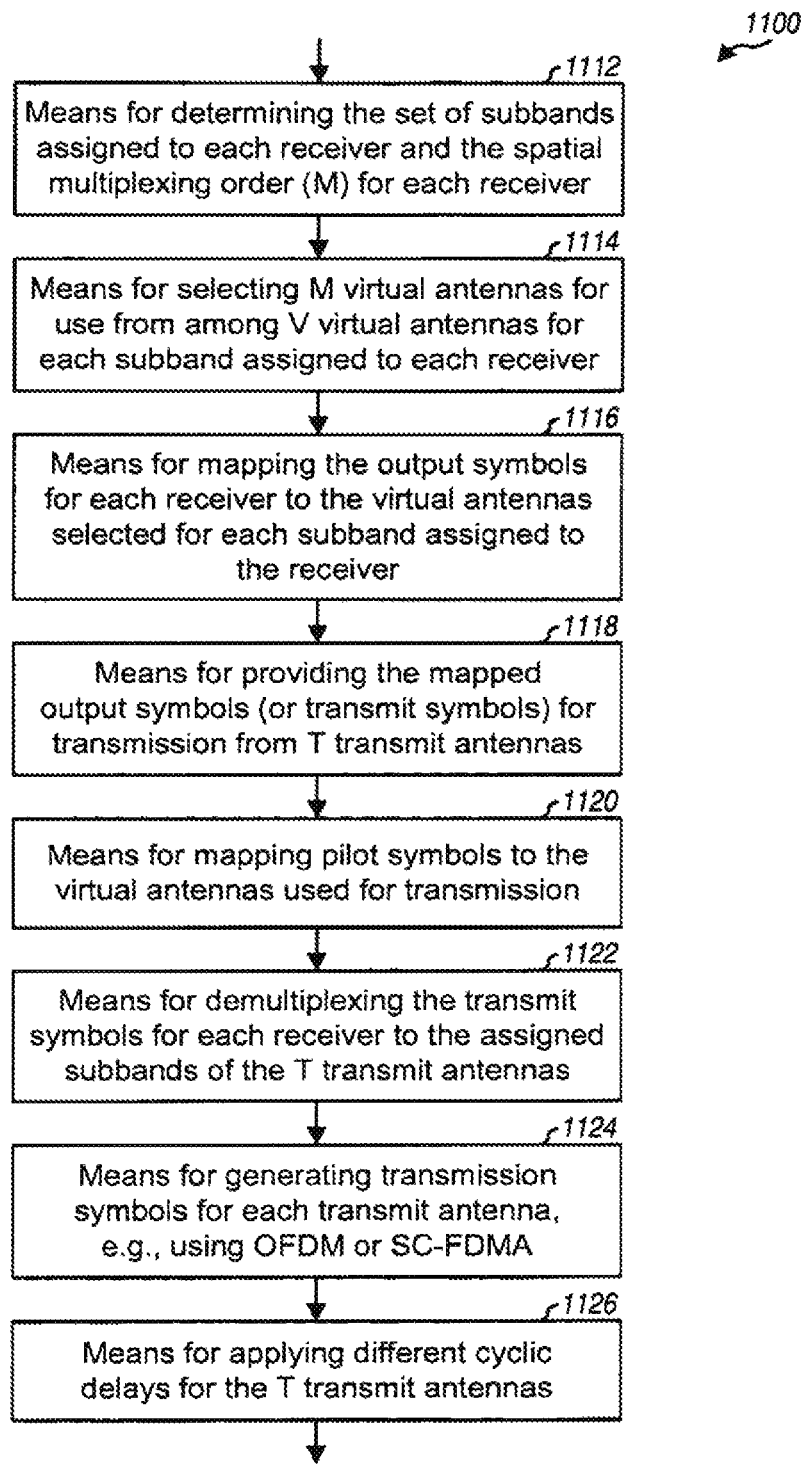
FIG. 11 shows an apparatus for transmitting data and pilot to one or more receivers.

FIG. 11 shows an embodiment of an apparatus 1100 for transmitting data and pilot to one or more receivers. Apparatus 1100 includes means for determining the set of subcarriers assigned to each receiver and the spatial multiplexing order (M) for each receiver (block 1112), means for selecting M virtual antennas for use from among V virtual antennas for each subcarrier assigned to each receiver (block 1114), means for mapping the output symbols for each receiver to the virtual antennas selected for each subcarrier assigned to the receiver (e.g., by applying selected columns of an orthonormal matrix or selected mapping patterns) (block 1116), means for providing the mapped output symbols (or transmit symbols) for transmission from T transmit antennas (block 1118), means for mapping pilot symbols to the virtual antennas used for transmission (block 1120), means for demultiplexing the transmit symbols for each receiver to the assigned subcarriers of the T transmit antennas (block 1122), means for generating transmission symbols for each transmit antenna, e.g., using OFDM or SC-FDMA (block 1124), and means for applying different cyclic delays for the T transmit antennas (block 1126).

Figure 12:
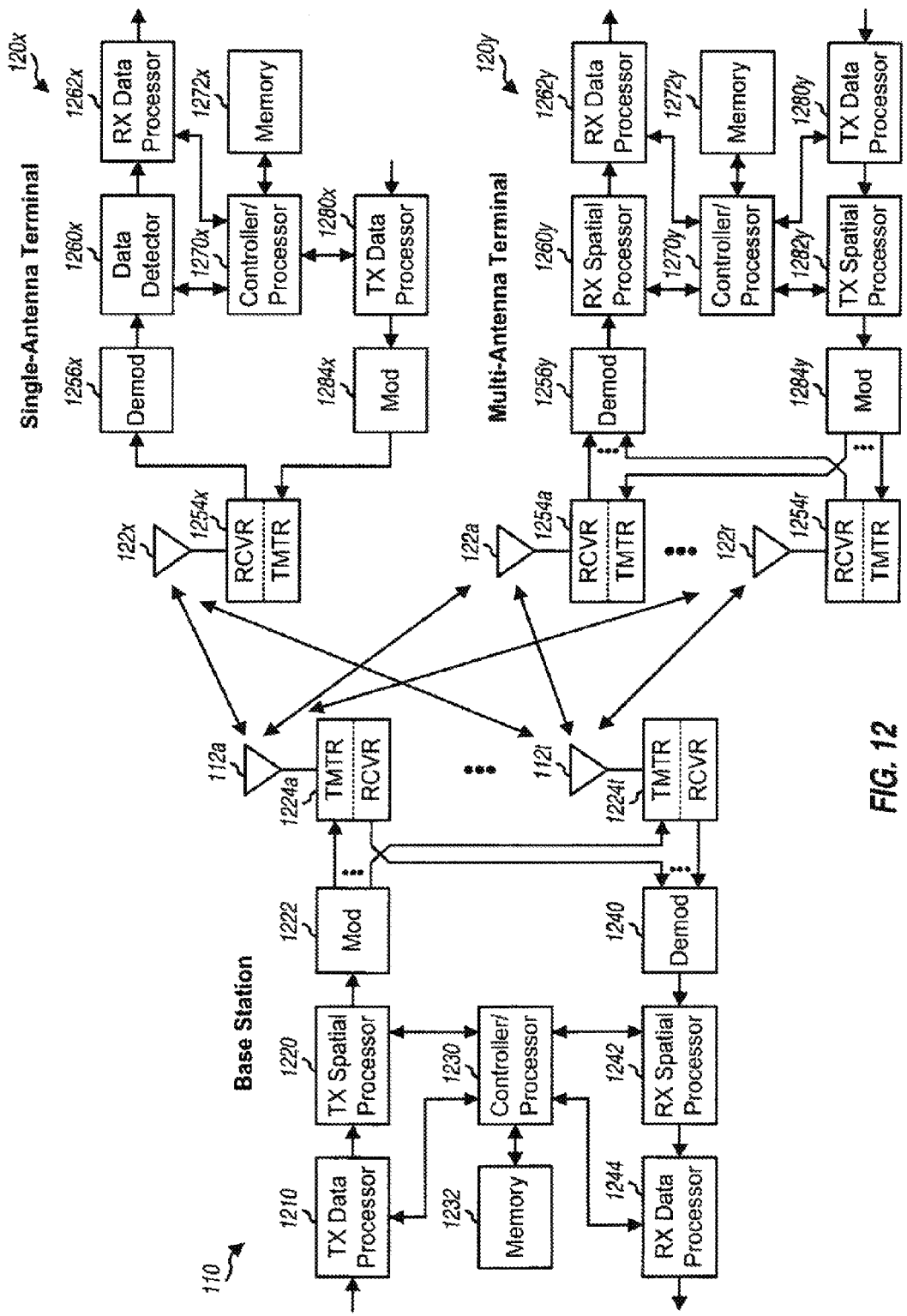
FIG. 12 shows a block diagram of a base station and two terminals.

FIG. 12 shows a block diagram of an embodiment of base station 110, single-antenna terminal 120x, and multi-antenna terminal 120y. At base station 110, a transmit (TX) data processor 1210 receives data for one or more terminals, processes (e.g., encodes, interleaves, and symbol maps) the data based on one or more coding and modulation schemes, and provides modulation symbols. TX data processor 1210 typically processes the data for each terminal separately based on a coding and modulation scheme selected for that terminal. If system 100 utilizes SC-FDMA, then TX data processor 1210 may perform FFT/DFT on the modulation symbols for each terminal to obtain frequency-domain symbols for that terminal. TX data processor 1210 obtains output symbols for each terminal (which may be modulation symbols for OFDM or frequency-domain symbols for SC-FDMA) and multiplexes the output symbols for the terminal onto the subcarriers and virtual antennas used for that terminal. TX data processor 1210 further multiplexes pilot symbols onto the subcarriers and virtual antennas used for pilot transmission.

A TX spatial processor 1220 receives the multiplexed output symbols and pilot symbols, performs spatial processing for each subcarrier, e.g., as shown in equation (3) or (7), and provides transmit symbols for the T transmit antennas. A modulator (Mod) 1222 processes the transmit symbols for each transmit antenna, e.g., for OFDM, SC-FDMA, or some other modulation technique, and generates an output sample stream for that transmit antenna Since TX spatial processor 1220 performs spatial processing for each subcarrier, the SC-FDMA modulation is divided into two parts that are performed by TX data processor 1210 and modulator 1222. Modulator 1222 provides T output sample streams to T transmitter units (TMTR) 1224a through 1224t. Each transmitter unit 1224 processes (e.g., converts to analog, amplifies, filters, and frequency upconverts) its output sample stream and generates a modulated signal. T modulated signals from transmitter units 1224a through 1224t are transmitted from T antennas 112a through 112t, respectively.

At each terminal 120, one or multiple antennas 122 receive the modulated signals transmitted by base station 110, and each antenna provides a received signal to a respective receiver unit (RCVR) 1254. Each receiver unit 1254 processes (e.g., amplifies, filters, frequency downconverts, and digitizes) its receive signal and provides received samples to a demodulator (Demod) 1256. Demodulator 1256 processes the received samples for each receive antenna 122 (e.g., based on OFDM, SC-FDMA, or some other modulation technique), obtains frequency-domain received symbols for the K total subcarriers, provides received symbols for the assigned subcarriers, and provides received pilot symbols for the subcarriers used for pilot transmission.

For single-antenna terminal 120x, a data detector 1260x obtains received symbols from demodulator 1256x, derives channel estimates for the assigned subcarriers based on the received pilot symbols, and performs data detection (e.g., equalization) on the received symbols based on the channel estimates to obtain detected symbols, which are estimates of the output symbols transmitted to terminal 120x. For multi-antenna terminal 120y, a receive (RX) spatial processor 1260y obtains received symbols from demodulator 1256y, derives channel estimates for the assigned subcarriers based on the received pilot symbols, and performs receiver spatial processing on the received symbols based on the channel estimates to obtain detected symbols. RX spatial processor 1260y may implement a minimum mean square error (MMSE) technique, a zero-forcing (ZF) technique, a maximal ratio combining (MRC) technique, a successive interference cancellation technique, or some other receiver processing technique. For each terminal, an RX data processor 1262 processes (e.g., symbol demaps, deinterleaves, and decodes) the detected symbols and provides decoded data for the terminal. In general, the processing by each terminal 120 is complementary to the processing by base station 110.

Each terminal 120 may generate feedback information for the data transmission to that terminal. For example, each terminal 120 may estimate the SNRs for the virtual antennas, e.g., based on the received pilot symbols. Each terminal 120 may select one or more coding and modulation schemes, one or more packet formats, one or more virtual antennas to use for data transmission, one or more orthonormal matrices, and so on based on the SNR estimates and/or other information. Each terminal 120 may also generate acknowledgments (ACKs) for correctly received data packets. The feedback information may include the SNR estimates, the selected coding and modulation schemes, the selected virtual antenna(s), the selected orthonormal matrix(ces), the selected subcarrier(s), ACKs, information used for power control, some other information, or any combination thereof. The feedback information is processed by a TX data processor 1280, further processed by a TX spatial processor 1282 if multiple antennas are present, modulated by a modulator 1284, conditioned by transmitter unit(s) 1254, and transmitted via antenna(s) 122 to base station 110. At base station 110, the modulated signals transmitted by terminals 120x and 120y are received by antennas 112, conditioned by, receiver units 1224, and processed by a demodulator 1240, an RX spatial processor 1242; and an RX data processor 1244 to recover the feedback information sent by the terminals. A controller/processor 1230 uses the feedback information to determine the data rates and coding and modulation schemes to use for the data transmission to each terminal as well as to generate various controls for TX data processor 1210 and TX spatial processor 1220.

Controllers/processors 1230, 1270x and 1270y control the operation of various processing units at base station 110 and terminals 120x and 120y, respectively. Memory units 1232, 1272x and 1272y store data and program codes used by base station 110 and terminals 120x and 120y, respectively. Controller/processor 1230 may implement parts of FIGS. 10 and 11 and may (1) assign subcarriers and select the spatial multiplexing order for each terminal (block 1012 in FIG. 10) and (2) select the virtual antennas for each subcarrier assigned to each terminal (block 1214 in FIG. 10). TX data processor 1220 may implement parts of FIGS. 10 and 11 and perform the processing shown in blocks 1116 through 1126 in FIG. 10.

For clarity, much of the description above is for a system with K total subcarriers. The transmission techniques described herein may also be used for a system with a single subcarrier. For such a system, k in the description above may be an index for symbol period instead of subcarrier.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 1230, 1272x or 1272y in FIG. 12) and executed by a processor (e.g., processor 1232, 1270x or 1270y). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. An apparatus, comprising:
   at least one processor configured to:
      receive a data vector;
      receive feedback from a receiver;
      select, based on the feedback, a plurality of virtual antennas representing antenna ports;
      form a permutation matrix indicative of the plurality of virtual antennas selected;
      apply the permutation matrix to the data vector to create output symbols; and
      provide the output symbols to the antenna ports; and
   a memory coupled to the at least one processor.

2. The apparatus of claim 1, wherein the at least one processor is further configured to use an orthonormal matrix to form the plurality of virtual antennas.

3. The apparatus of claim 2, wherein the at least one processor is further configured to select the orthonormal matrix from among a plurality of orthonormal matrices available to form the plurality of virtual antennas.

4. The apparatus of claim 3, wherein the at least one processor is further configured to select, based on the feedback, the orthonormal matrix from among the plurality of orthonormal matrices available to form the plurality of virtual antennas.

5. The apparatus of claim 1, further comprising at least one of a base station or a terminal, with which the at least one processor is integrated.

6. The apparatus of claim 1, wherein there are a quantity of V virtual transmit antennas in the plurality of virtual antennas, a quantity of T transmit antennas in a plurality of transmit antennas, the at least one processor is further configured to use an orthonormal T×V matrix to form the quantity of V virtual transmit antennas, and the at least one processor is further configured to define the orthonormal T×V matrix such that a sum of a squared magnitude of V entries in each row of the orthonormal T×V matrix is equal to a constant value.

7. The apparatus of claim 1, wherein the feedback indicates specific virtual antennas in the plurality of virtual antennas to use for all assigned subcarriers.

8. The apparatus of claim 1, wherein the feedback indicates specific virtual antennas in the plurality of virtual antennas to use for each assigned subcarrier.

9. The apparatus of claim 1, wherein the at least one processor is further configured to:
   estimate an uplink channel response based on a received pilot;
   estimate a downlink channel response based on the uplink channel response estimate; and
   use the downlink channel response estimate to select the plurality of virtual antennas.

10. A method, comprising:
    receiving a data vector;
    receiving feedback from a receiver;
    selecting, based on the feedback, a plurality of virtual antennas representing antenna ports;
    forming a permutation matrix indicative of the plurality of virtual antennas selected;
    applying the permutation matrix to the data vector to create output symbols; and
    providing the output symbols to the antenna ports.

11. The method of claim 10, further comprising using an orthonormal matrix to form the plurality of virtual antennas.

12. The method of claim 11, further comprising selecting the orthonormal matrix from among a plurality of orthonormal matrices available to form the plurality of virtual antennas.

13. The method of claim 12, further comprising selecting, based on the feedback, the orthonormal matrix from among the plurality of orthonormal matrices available to form the plurality of virtual antennas.

14. An apparatus, comprising:
    means for receiving a data vector;
    means for receiving feedback from a receiver;
    means for selecting, based on the feedback, a plurality of virtual antennas representing antenna ports;
    means for forming a permutation matrix indicative of the plurality of virtual antennas selected;
    means for applying the permutation matrix to the data vector to create output symbols; and
    means for providing the output symbols to the antenna ports.

15. The apparatus of claim 14, further comprising means for using an orthonormal matrix to form the plurality of virtual antennas.

16. The apparatus of claim 15, further comprising means for selecting the orthonormal matrix from among a plurality of orthonormal matrices available to form the plurality of virtual antennas.

17. The apparatus of claim 16, further comprising means for selecting, based on the feedback, the orthonormal matrix from among the plurality of orthonormal matrices available to form the plurality of virtual antennas.

18. The apparatus of claim 14, further comprising at least one of a base station or a terminal, with which the means for receiving the data vector is integrated.

19. A non-transitory computer-readable medium, comprising processor-executable instructions stored thereon that are configured to cause a processor to:
    receive a data vector;
    receive feedback from a receiver;
    select, based on the feedback, a plurality of virtual antennas representing antenna ports;
    form a permutation matrix indicative of the plurality of virtual antennas selected;
    apply the permutation matrix to the data vector to create output symbols; and
    provide the output symbols to the antenna ports.

20. The non-transitory computer-readable medium of claim 19, wherein the processor-executable instructions are further configured to cause the processor to use an orthonormal matrix to form the plurality of virtual antennas.

21. The non-transitory computer-readable medium of claim 20, wherein the processor-executable instructions are further configured to cause the processor to select the orthonormal matrix from among a plurality of orthonormal matrices available to form the plurality of virtual antennas.

22. The non-transitory computer-readable medium of claim 21, wherein the processor-executable instructions are further configured to cause the processor to select, based on the feedback, the orthonormal matrix from among the plurality of orthonormal matrices available to form the plurality of virtual antennas.

23. An apparatus, comprising:
- a processor that is integrated with at least one of a base station or a terminal; and
- a memory, comprising processor-executable instructions stored thereon that are configured to cause the processor to:
  - receive a data vector;
  - receive feedback from a receiver;
  - select, based on the feedback, a plurality of virtual antennas representing antenna ports;
  - form a permutation matrix indicative of the plurality of virtual antennas selected;
  - apply the permutation matrix to the data vector to create output symbols; and
  - provide the output symbols to the antenna ports.

* * * * *